US012562096B2

(12) United States Patent
Yu et al.

(10) Patent No.: US 12,562,096 B2
(45) Date of Patent: Feb. 24, 2026

(54) DISPLAY DRIVING CIRCUIT, DISPLAY DEVICE COMPRISING THEREOF AND OPERATING METHOD OF DISPLAY DRIVING CIRCUIT

(71) Applicant: SAMSUNG ELECTRONICS CO., LTD., Suwon-si (KR)

(72) Inventors: Taekon Yu, Suwon-si (KR); Jonghee Na, Suwon-si (KR); Sewhan Na, Suwon-si (KR); Hyeonsu Park, Suwon-si (KR); Hyunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 18/523,354

(22) Filed: Nov. 29, 2023

(65) Prior Publication Data

US 2024/0185764 A1 Jun. 6, 2024

(30) Foreign Application Priority Data

Dec. 6, 2022 (KR) ........................ 10-2022-0169139
Apr. 19, 2023 (KR) ........................ 10-2023-0051428

(51) Int. Cl.
*G09G 3/20* (2006.01)
*G09G 3/3225* (2016.01)

(52) U.S. Cl.
CPC ......... *G09G 3/2096* (2013.01); *G09G 3/3225* (2013.01); *G09G 2300/0819* (2013.01);
(Continued)

(58) Field of Classification Search
CPC .. G09G 3/2096; G09G 3/3225; G09G 3/3233; G09G 2300/0819;
(Continued)

(56) References Cited

U.S. PATENT DOCUMENTS 7,567,229 B2 7/2009 Kasai et al.
9,741,281 B2 8/2017 Kim et al.
(Continued)

FOREIGN PATENT DOCUMENTS

JP 2008-111892 A 5/2008
KR 10-1688892 B1 12/2016
(Continued)

OTHER PUBLICATIONS

Jeong et al., "A New Crosstalk Compensation Method in Line Inversion TFT-LCD's," IEEE Transactions on Circuits and Systems-I: Fundamental Theory and Applications, vol. 44, No. 6, pp. 552-555, Jun. 1997.
(Continued)

*Primary Examiner* — Nelson M Rosario
(74) *Attorney, Agent, or Firm* — Sughrue Mion, PLLC

(57) ABSTRACT

A display driving circuit includes: a compensation control circuit configured to: generate a compensation voltage based on input image data and information of a display panel operatively connected to the display driving circuit, and compensate a data voltage of the input image data based on the compensation voltage; and a timing control circuit configured to output the compensated data voltage to a plurality of pixels in the display panel.

14 Claims, 18 Drawing Sheets

(52) U.S. Cl.
CPC . *G09G 2300/0842* (2013.01); *G09G 2310/08* (2013.01); *G09G 2320/0209* (2013.01); *G09G 2320/045* (2013.01); *G09G 2340/00* (2013.01)

(58) Field of Classification Search
CPC ....... G09G 2300/0842; G09G 2310/08; G09G 2320/0209; G09G 2320/045; G09G 2340/00
See application file for complete search history.

(56) References Cited

U.S. PATENT DOCUMENTS

| | | | | |
|---|---|---|---|---|
| 9,779,663 | B2 | 10/2017 | Kim et al. | |
| 10,993,431 | B2 | 5/2021 | Fujii et al. | |
| 11,145,236 | B2 | 10/2021 | Baek | |
| 11,656,729 | B2 | 5/2023 | Park et al. | |
| 11,823,637 | B2 * | 11/2023 | Lin | G09G 3/3688 |
| 2004/0239587 | A1 | 12/2004 | Murata et al. | |
| 2008/0012811 | A1 | 1/2008 | Sung et al. | |
| 2018/0182303 | A1 * | 6/2018 | Jung | G09G 3/3258 |
| 2021/0335262 | A1 * | 10/2021 | Wu | G09G 3/3291 |

FOREIGN PATENT DOCUMENTS

| | | | |
|---|---|---|---|
| KR | 10-2021-0057892 | A | 5/2021 |
| KR | 10-2339650 | B1 | 12/2021 |
| KR | 10-2022-0112574 | A | 8/2022 |

OTHER PUBLICATIONS

Kim et al., "Inter-Electrode Coupling and Crosstalk Mechanism in TFT-LCDs," Journal of Display Technology, vol. 7, No. 5, pp. 267-273, May 2011.

Liu et al., "Research on Crosstalk of High Frequency and High Resolution OLED Display Devices," International Conference on Display Technology 2021, vol. 52, Issue S2, Aug. 2021, Total 4 pages.

* cited by examiner

DISPLAY DRIVING CIRCUIT, DISPLAY DEVICE COMPRISING THEREOF AND OPERATING METHOD OF DISPLAY DRIVING CIRCUIT

CROSS-REFERENCE TO RELATED APPLICATIONS

This application is based on and claims priority under 35 U.S.C. § 119 to Korean Patent Application No. 10-2022-0169139, filed on Dec. 6, 2022, and Korean Patent Application No. 10-2023-0051428, filed on Apr. 19, 2023, in the Korean Intellectual Property Office, the disclosures of which are incorporated by reference herein in their entireties.

BACKGROUND

The disclosure relates to a semiconductor device, and more particularly, to a display driving circuit with reduced crosstalk caused by coupling of a driving voltage, a display device comprising the same, and an operating method of the display driving circuit.

Display devices, which are widely used in smartphones, notebook computers, monitors and the like, have a display panel for displaying images, wherein a plurality of pixels are arranged in the display panel. As the pixels are driven by data signals provided from a display driver integrated circuit (IC), images are output on the display panel.

As the size of displays increases, the resolution thereof increases. Accordingly, when a reference voltage generator supplies a reference voltage to the display panel through a buffer circuit, defects in image quality, such as crosstalk, may occur. The crosstalk is electrical interference in which unwanted pixels are affected by driving of neighboring pixels in the display panel.

SUMMARY

Provided are a display driving circuit that reduces noise such as crosstalk caused by coupling of driving voltage generated from a display panel, a display device comprising the same, and an operating method of the display driving circuit.

The disclosures are not limited to the disclosure mentioned above, and other disclosures not mentioned may be clearly understood by those skilled in the art from the description below.

According to an aspect of an embodiment, a display driving circuit includes: a compensation control circuit configured to: generate a compensation voltage based on input image data and information of a display panel operatively connected to the display driving circuit, and compensate a data voltage of the input image data based on the compensation voltage; and a timing control circuit configured to output the compensated data voltage to a plurality of pixels in the display panel.

According to an aspect of an embodiment, a display driving circuit includes: a compensation control circuit configured to: after a first ripple of a driving voltage in a target line of a display panel occurs, generate a first compensation voltage for the target line based on a stabilization period of the driving voltage of the target line, and compensate a data voltage of input image data based on the first compensation voltage; and a timing control circuit configured to output the compensated data voltage to a plurality of pixels arranged in a plurality of lines in the display panel.

According to an aspect of an embodiment, a display driving circuit includes: a compensation control circuit configured to: generate a compensation voltage based on an on pixel ratio (OPR) of a previous line to a target line of a display panel that is operatively connected to the display driving circuit, and based on the generated compensation voltage, compensate a data voltage of input image data: and a timing control circuit configured to output the compensated data voltage to a plurality of pixels arranged in a plurality of lines in the display panel, wherein the target line is a nth scan line and the previous line is a n-1th scan line.

According to an aspect of an embodiment, a display device includes: a display panel in which a plurality of pixels are arranged in a plurality of lines: and a display driving circuit configured to: receive input image data from a host processor, generate a first compensation voltage for a target line based on at least one of first compensation data, second compensation data, third compensation data, and fourth compensation data, compensate a data voltage of the input image data based on the generated first compensation voltage, and output the compensated data voltage to the plurality of pixels, wherein the first compensation data is generated based on a variance of the data voltage of the input image data and information of the display panel, wherein, after a first ripple of a driving voltage occurs in the target line of the display panel, the second compensation data is generated based on a stabilization period of the driving voltage of the target line, wherein the third compensation data is generated based on an on pixel ratio (OPR) of a previous line to the target line, wherein the fourth compensation data is generated based on a vertical distance from the display driving circuit to each of the plurality of pixels, and wherein the target line is a nth scan line and the previous line is a n-1th scan line.

BRIEF DESCRIPTION OF THE DRAWINGS

Embodiments will be more clearly understood from the following detailed description taken in conjunction with the accompanying drawings in which.

DETAILED DESCRIPTION

Figure 1A:
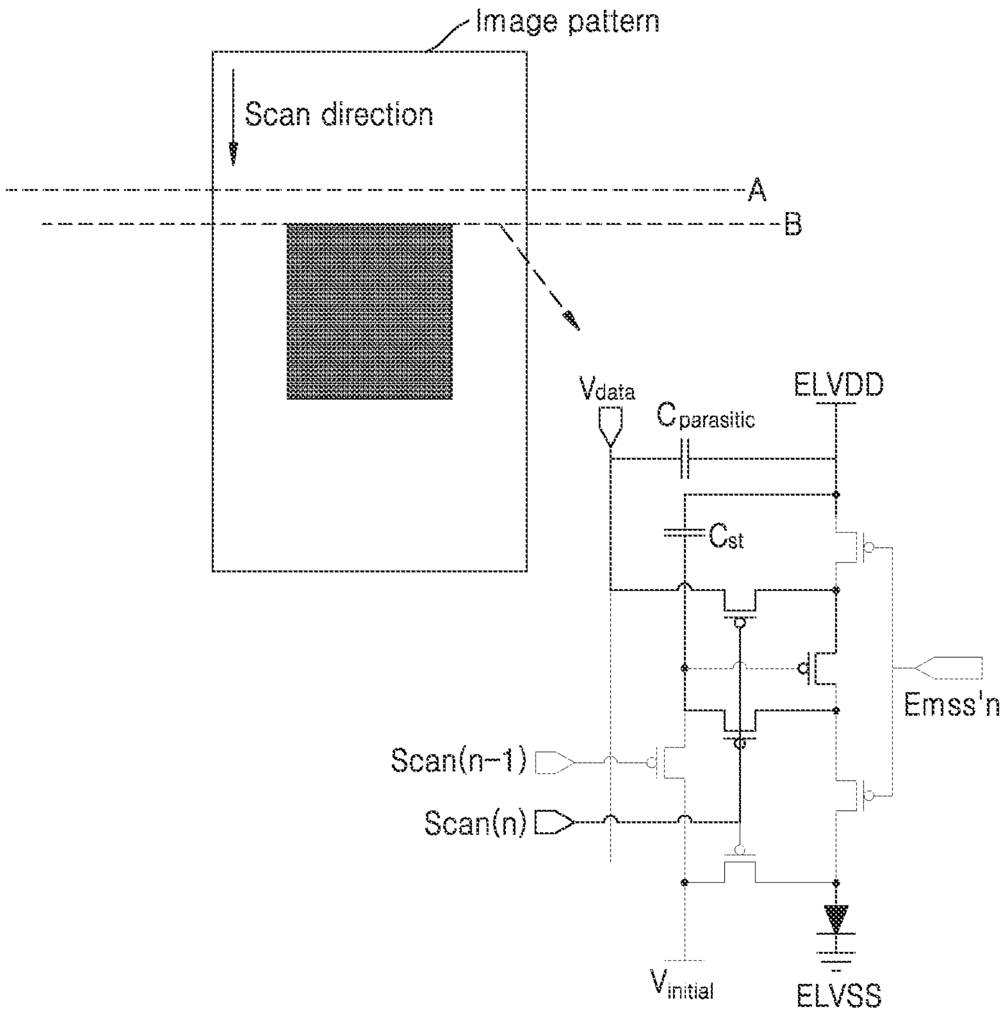
FIG. 1A is a circuit diagram for illustrating a cause of crosstalk, according to an embodiment.

Although the embodiments have been described with reference to the accompanying drawings, those skilled in the art may understand that the disclosure may be embodied in other specific forms without changing its technical spirit or essential characteristics. Therefore, it shall be understood that the embodiments described above are illustrative in all respects and not limiting.

The embodiments described herein are non-limiting example embodiments, and thus, the disclosure is not limited thereto and may be realized in various other forms.

Although the terms "first", "second", etc. may be used herein to describe various elements or components, these elements or components should not be limited by these terms. These terms are only used to distinguish one element or component from another element or component. Therefore, a first element or component discussed below could be termed a second element or component without departing from the technical spirits of the present disclosure.

When an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. Similarly, the term "set" means one or more. Accordingly, the set of items may be a single item or a collection of two or more items.

In the detailed description, components described with reference to the terms "part", "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Hereinafter, embodiments will be described in detail with reference to the accompanying drawings.

FIG. 1A is a circuit diagram for illustrating a cause of crosstalk, according to an embodiment.

In FIG. 1A, in one embodiment, a display panel is an organic light emitting diode (OLED) display panel where each of pixels includes an OLED. However, the display panel is not limited thereto. In some embodiments, the display panel may be implemented as a flat display panel or a flexible display panel of different types.

As shown in FIG. 1A, in one embodiment, the scan direction for the image on the display panel is from top to bottom, the image pattern at the A position remains constant (e.g., a gray area), and the image pattern at the position B transitions (e.g., from the gray area to a black area).

FIG. 1A shows a circuit diagram of a backplane of the display panel (e.g., an OLED). For example, an OLED display is a hold-type display that applies a voltage Vcst charged in a storage capacitance Cst (or data voltage Vdata) of the backplane of the display panel to each corresponding pixel of the display panel and drives image data of one frame. The backplane of the display panel may include a plurality of lines for supplying power and transmitting/receiving data and control information for driving pixels, and multiple parasitic capacitances may exist between the lines. In particular, the parasitic capacitance Cparasitic generated between the crossed driving voltage ELVDD lines and the data lines may cause coupling of the driving voltage upon a transition of the data voltage Vdata, resulting in a ripple of the driving voltage.

For example, at the position A, the data voltage Vdata may be maintained constant as an image pattern is maintained constant. In contrast, at the position B, as the image pattern transitions, the data voltage Vdata may transition greatly, thereby causing the parasitic capacitance Cparasitic. The occurrence of crosstalk due to the parasitic capacitance Cparasitic at the position B is illustrated in FIG. 1B.

Figure 1B:
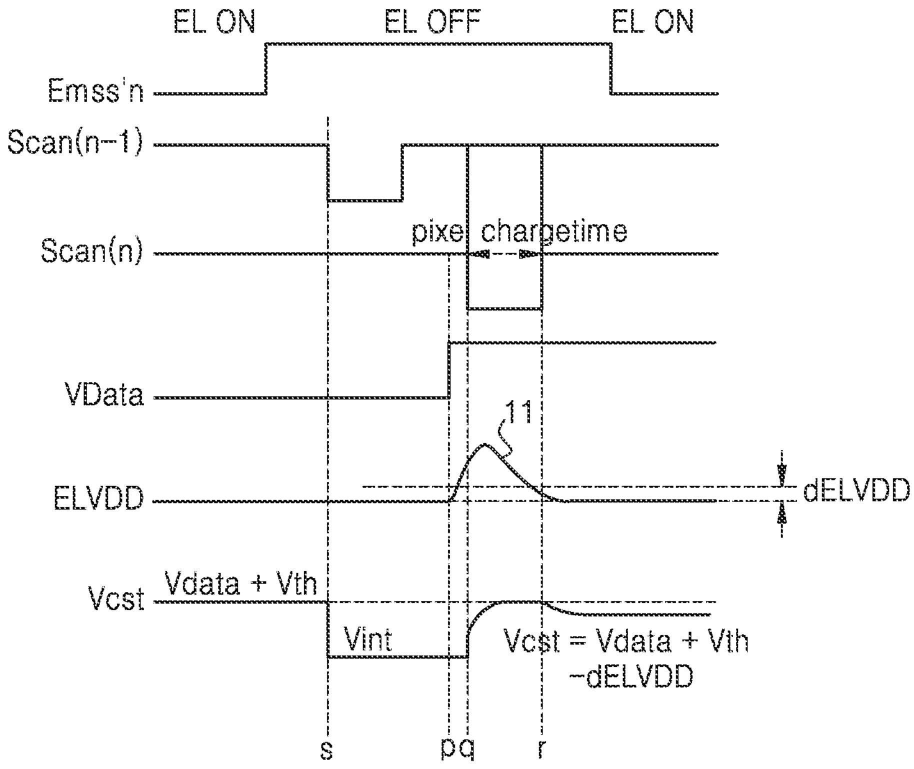
FIG. 1B is a timing diagram for illustrating an occurrence of crosstalk, according to an embodiment.

FIG. 1B is a timing diagram for illustrating an occurrence of crosstalk according to an embodiment.

Specifically, FIG. 1B is a timing diagram for illustrating an occurrence of crosstalk according to the transition in the data voltage signal Vdata at the position B of FIG. 1A.

In an EL OFF state in which an emission voltage signal Emss'n of FIG. 1B is maintained at a high level, in one embodiment, the time point at which an n-1$^{th}$ scan voltage signal 'Scan(n-1)' transitions (e.g. from high level to low level) is "time point s". The time point at which the data voltage signal Vdata of the pixel transitions (e.g., from low level to high level) is "time point p". The time point at which an n$^{th}$ scan voltage signal Scan(n) makes the first transition (e.g., from high level to low level) is "time point q". The time point at which the n$^{th}$ scan voltage signal Scan(n) makes the second transition (e.g., from low level to high level) is "time point r", where the amount of ripple occurring in the driving voltage ELVDD due to the transition of the data voltage Vdata at time point r is "dELVDD". For example, the period during which the data voltage Vdata is charged in the pixel by the storage capacitance Cst at the position B of FIG. 1A may refer to a period from "time point q" to "time point r".

Referring to FIG. 1B, as the n-1$^{th}$ scan voltage signal Scan(n-1) transitions to a low level at the time point s, the voltage Vest charged in the storage capacitance Cst at the position B may be initialized from an existing voltage value (e.g., "Vdata+Vth", where Vth refers to the minimum threshold voltage value for driving the display device) to an initialization voltage value (e.g., "Vint").

The data voltage Vdata may transition from a low level to a high level as the image pattern of FIG. 1A transitions (e.g., from gray area to black area) at the time point p. The transition of the data voltage Vdata, as described above with reference to FIG. 1A, may cause a ripple 11 in the driving voltage ELVDD due to the coupling of the driving voltage ELVDD. The ripple 11 of the driving voltage ELVDD may be a phenomenon in which the driving voltage ELVDD temporarily fluctuates due to internal factors, external factors of the display device and/or environmental factors in which the device operates.

As the n$^{th}$ scan voltage signal 'Scan(n)' transitions from a low level to a high level from the time point q to the time point r, the voltage Vest at the position B may be charged based on the data voltage Vdata. However, due to the ripple 11 (e.g., dELVDD) of the driving voltage ELVDD occurring at the position B, the voltage Vest charged in the storage capacitance Cst at the time point r at the position B may transition not to "Vdata+Vth", which is a target charging voltage value, but to "Vdata+Vth-dELVDD". As described above, when the pixel is charged with a voltage value different from the target charging voltage value, crosstalk where the pixel is represented by a luminance value different from the luminance value to be displayed occurs, which may deteriorate the performance of the entire display device.

Embodiments in FIGS. 2 to 11 described below may provide a display driving circuit that effectively compensates for crosstalk using a compensation voltage generated considering characteristics of the display panel and/or a cause of crosstalk, and a display device or a display system including the same.

Figure 2:
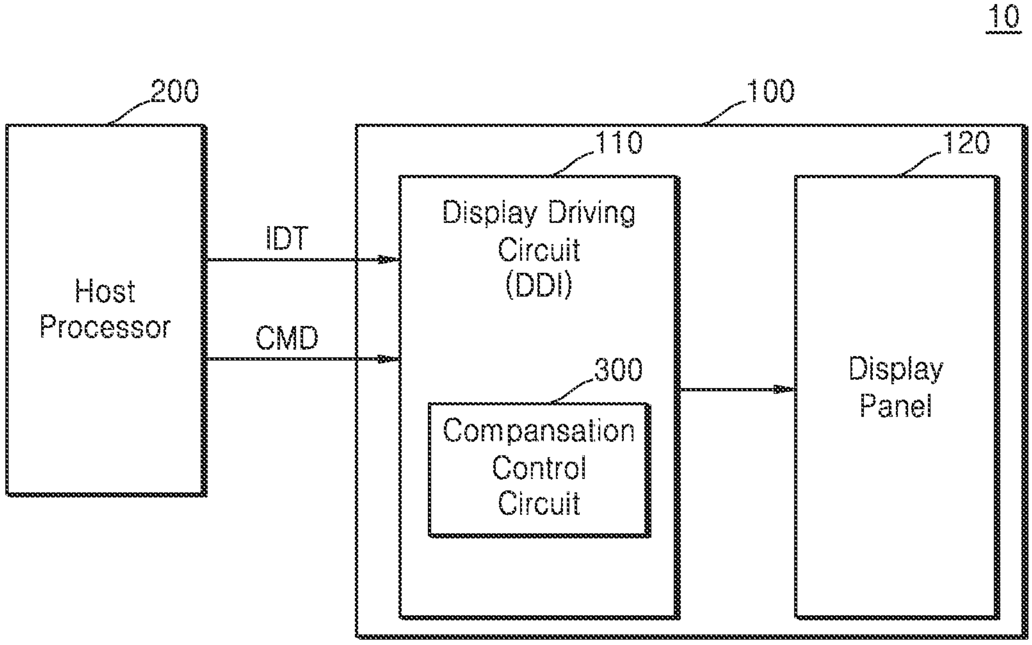
FIG. 2 is a block diagram of a display device and a display system including the same, according to an embodiment.

FIG. 2 is a block diagram of a display device and a display system including the same, according to an embodiment.

According to an embodiment, a display system 10 may be mounted on an electronic device having an image display function. For example, the electronic device may include a smartphone, a tablet personal computer (PC), a portable multimedia player (PMP), a camera, a wearable device, a television, a digital video disk (DVD) player, a refrigerator, an air conditioner, an air cleaner, a set-top box, a robot, a drone, various medical devices, a navigation device, a global positioning system (GPS) receiver, a vehicle device, furniture, or various measuring instruments, and the like.

Referring to FIG. 2, the display system 10 may include a display device 100 and a host processor 200, where the display device 100 may include a display driving circuit 110 (also referred to as a display driving integrated circuit) and a display panel 120.

The host processor 200 may generate image data IDT to be displayed on the display panel 120, and may transmit the image data IDT and control command CMD to the display driving circuit 110. For example, the control command CMD may include setting information about luminance, gamma, frame frequency, operating mode of the display driving circuit 110, and the like. The host processor 200 may transmit a clock signal or a synchronization signal to the display driving circuit 110.

The host processor 200 may be a graphics processor. However, the host processor 200 is not limited thereto. In some embodiments, the host may be implemented as various types of processors such as a central processing unit (CPU), a microprocessor, a multimedia processor, an application processor, and the like. In an embodiment, the host processor 200 may be implemented as an integrated circuit (IC) or a system on chip (SoC).

The display device 100 may display the image data IDT received from the host processor 200. In an embodiment, the display device 100 may be a device in which the display driving circuit 110 and the display panel 120 are implemented as one module. For example, the display driving circuit 110 may be mounted on a substrate of the display panel 120 or may be electrically connected to the display panel 120 via a connecting member such as a flexible printed circuit board FPCB.

The display panel 120 is a display for displaying an actual image, and may be one of display devices, which receive an electrically transmitted image signal and display a two-dimensional image, such as an OLED display, a thin film transistor-liquid crystal display (TFT-LCD), a field emission display, and a plasma display panel (PDP). In one embodiment, the display panel 120 may be an OLED display panel where each of pixels includes an OLED. However, the display panel 120 is not limited thereto. In some embodiments, the display panel 120 may be implemented as a flat display panel or a flexible display panel of different types.

The display driving circuit 110 may convert the image data IDT received from the host processor 200 into a plurality of analog signals for driving the display panel 120, e.g., a plurality of data voltages, and may supply the plurality of analog signals to the display panel 120. Accordingly, an image corresponding to the image data IDT may be displayed on the display panel 120.

According to an embodiment, the display driving circuit 110 may include a compensation control circuit 300. The compensation control circuit 300 may compensate for a data voltage using a compensation voltage generated based on the characteristics of the display panel and/or the cause of crosstalk. For example, the compensation control circuit 300 may generate the compensation voltage based on at least one of data variance information according to the image pattern, on pixel ratio (OPR) information, distance information from a display driving circuit to a pixel, and information about a stabilization period of a display driving voltage. The compensation control circuit 300 may compensate for a variance of the data voltage due to crosstalk by adding the generated compensation voltage to the existing data voltage.

The display driving circuit 110 may include a reference voltage generator (a gamma voltage generator 115 in FIG. 3) for converting a pixel value into a reference voltage (or grayscale voltage) corresponding to the grayscale indicated by the pixel value, and may apply the reference voltage corresponding to the pixel value to the pixel of the display panel 120. Accordingly, an optical signal having a luminance corresponding to the pixel value may be output from the pixel. The reference voltage generator may generate a plurality of reference voltages.

According to an embodiment, as described above, the display driving circuit 110 may reduce noise such as crosstalk through a compensation control circuit that may adaptively generate the compensation voltage according to the characteristics of the display panel and/or the cause of crosstalk.

Figure 3:
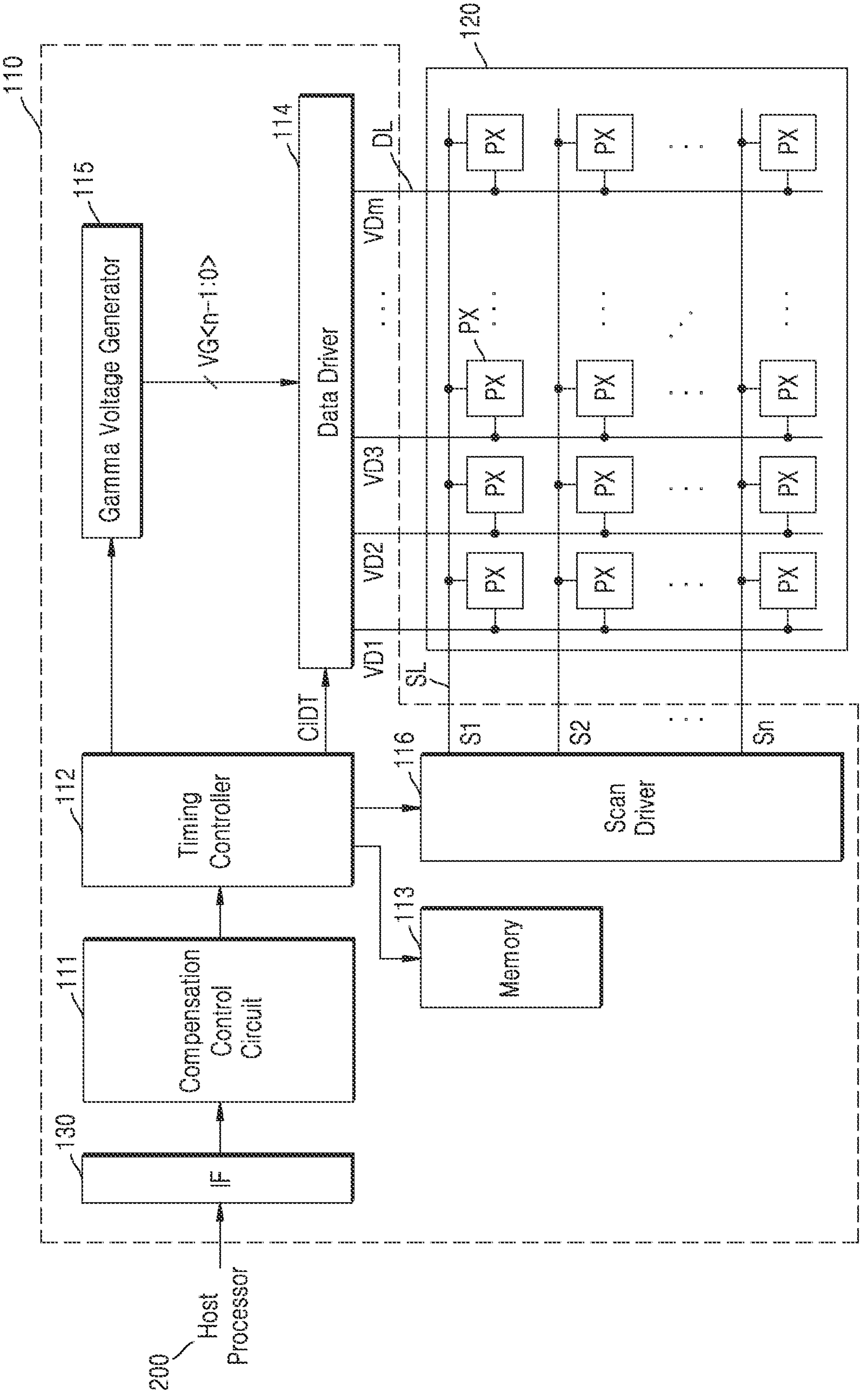
FIG. 3 is a block diagram of a display driving circuit and a display panel, according to an embodiment.

FIG. 3 is a block diagram of a display driving circuit and a display panel, according to an embodiment.

Specifically, FIG. 3 is a diagram of a display driving circuit 110 and a display panel 120 included in the display system 10 of FIG. 2. A compensation control circuit 111 of the display driving circuit 110 of FIG. 3 may correspond to the compensation control circuit 300 of the display driving circuit 110 of FIG. 2.

Referring to FIG. 3, the display driving circuit 110 may include an interface circuit 130, a compensation control circuit 111, a timing controller 112, memory 113, a data driver 114 (also referred to as a source driver), a gamma voltage generator 115, and a scan driver 116 (also referred to as a gate driver). The display driving circuit 110 may further include other general purpose components, such as a voltage generator, a clock generator, and the like.

In an embodiment, the interface circuit 130, the compensation control circuit 111, the timing controller 112, the memory 113, the data driver 114, the gamma voltage generator 115, and the scan driver 116 may be integrated into one semiconductor chip. Alternatively, the interface circuit 130, the compensation control circuit 111, the timing controller 112, the memory 113, the data driver 114, and the gamma voltage generator 115 may be formed on one semiconductor chip, and the scan driver 116 may be formed on the display panel (120 of FIG. 2).

The interface circuit 130 may transmit and receive signals or data to and from the host processor 200. The interface circuit 130 may be implemented as one of serial interfaces, such as a mobile industry processor interface (MIPI®), a mobile display digital interface (MDDI), a DisplayPort, or an embedded DisplayPort (eDP), and the like.

The memory 113 may store image data received from the host processor 200 in units of frames. In addition, the memory 113 may store a variety of data (e.g., ripple generation data of the driving voltage ELVDD previously generated in the display panel, or mean grayscale voltage data, compensation weight data according to the characteristics of the display panel, and the like) required when the compensation voltage is generated by the compensation control circuit 111 and then transmit the data to the compensation control circuit 111. The memory 113 may be referred to as graphics random access memory (RAM), a frame buffer, and the like. The memory 113 may include volatile memory, such as dynamic random access memory (DRAM), static random access memory (SRAM), or non-volatile memory such as read only memory (ROM) or flash memory, resistive random access memory (ReRAM), and magnetic random access memory (MRAM). The image data received from the host processor 200 may be stored in the memory 113 before or after being image processed by the timing controller 112. In an embodiment, the display driving circuit 110 may not include the memory 113, wherein the image data received from the host processor 200 may be image processed by the timing controller 112 and then transmitted to the data driver 114.

The compensation control circuit 111 may generate the compensation voltage based on characteristics of image data received from the host processor 200 and/or characteristics of the display panel 120, and may transmit the compensated image data (e.g., data voltage) based on the compensation voltage to the timing controller 112. A detailed description thereof is given below with reference to FIGS. 4 to 9C.

The compensation control circuit 111 may be implemented in hardware or a combination of software (or firmware) and hardware. For example, the compensation control circuit 111 may be implemented as hardware logic, such as an application specific IC (ASIC), a field programmable gate array (FPGA), a complex programmable logic device (CPLD), and the like, or may be implemented in firmware, software, or a combination of hardware and software, which run on processors, such as a micro-controller unit (MCU), CPU, and the like.

The timing controller 112 may control the overall operation of the display driving circuit 110, and may control the components, the display driving circuit 110, e.g., the interface circuit 130, the compensation control circuit 111, the memory 113, the data driver 114, the gamma voltage generator 115, and the scan driver 116, so that the image data received from the host processor 200 is displayed on the display panel 120. The timing controller 112 may generate and transmit the compensated image data CIDT to the data driver 114 based on the compensation voltage received from the compensation control circuit 111.

In one embodiment, the timing controller 112 may perform image processing for luminance change, size change, format change, and the like on the received image data, or may generate new image data to be displayed on the display panel 120 based on the received image data. The timing controller 112 may include intellectual properties (IPs) for image processing.

The gamma voltage generator 115 may generate a plurality of reference voltages VG<n-1:0> (also referred to as grayscale voltages or gamma voltages), e.g., n reference voltages VG<n-1:0>, where n is an integer greater than or equal to 2 based on the set gamma curve and may provide the reference voltages VG<n-1:0> to the data driver 114. According to the gamma setting value, the gamma voltage generator 115 may adjust the highest reference voltage and/or the lowest reference voltage, and may adjust the gamma curve. The gamma curve is a graph showing the luminance of the optical signal output from a pixel PX of the display panel 120 with respect to a plurality of grayscales. The voltage levels of the plurality of reference voltages VG<n-1:0> may be adjusted to output the optical signal of the luminance according to the set gamma curve, or the gamma curve may be adjusted according to the adjustment of the voltage levels of the plurality of reference voltages VG<n-1:0>. The gamma voltage generator 115 may provide the plurality of reference voltages VG<n-1:0> to the data driver 114.

The data driver 114 may convert the compensated image data CIDT received from the timing controller 112 into a plurality of video signals, e.g., a plurality of data voltages VD1 to VDm, and may output the plurality of data voltages VD1 to VDm to the display panel 120 via data lines DL.

The data driver 114 may receive the compensated image data CIDT in units of line data, i.e., units of data corresponding to a plurality of pixels included in one horizontal line of the display panel 120. The data driver 114 may convert the line data received from the timing controller 112 into the plurality of data voltages VD1 to VDm, where m is an integer greater than or equal to 2, based on the plurality of reference voltages VG<n-1:0> received from the gamma voltage generator 115.

The scan driver 116 may be connected with a plurality of scan lines SL of the display panel 120, and may sequentially drive the plurality of scan lines LS of the display panel 120. The scan driver 116 may sequentially provide a plurality of scan signals S1 to Sn, where n is a positive integer greater than or equal to 2, having an active level, e.g., logic high, to the plurality of scan lines SL under the control by the timing controller 112. Thus, the plurality of scan lines SL may be selected sequentially, and the plurality of data voltages VD1 to VDm may be applied to the plurality pixels PX connected to the selected scan lines SL.

The display panel 120 may include the plurality of data lines DL, the plurality of scan lines SL, and the plurality of pixels PX therebetween. Each of the plurality of pixels PX may be connected to a corresponding scan line SL and a corresponding data line DL.

Each of the plurality of pixels PX may output light of a preset color, and two or more pixels PX (e.g., red, blue, and green pixels) positioned adjacent to each other in the same line or adjacent lines and outputting light of different colors may constitute one unit pixel. The two or more pixels PX constituting a unit pixel may be referred to as sub-pixels. The display panel 120 may have an RGB structure in which red, blue and green pixels constitute one unit pixel. However, the display panel 120 is not limited thereto, and may have an RGBW structure in which the unit pixel further includes a white pixel to enhance luminance. Alternatively, the unit pixel of the display panel 120 may include a combination of pixels of colors other than red, green and blue.

The display panel 120 may be an OLED display panel in which each of the plurality of pixels PX includes an OLED. However, the display panel 120 is not limited thereto, and may be implemented as a flat display panel or a flexible display panel of different types.

Figure 4:
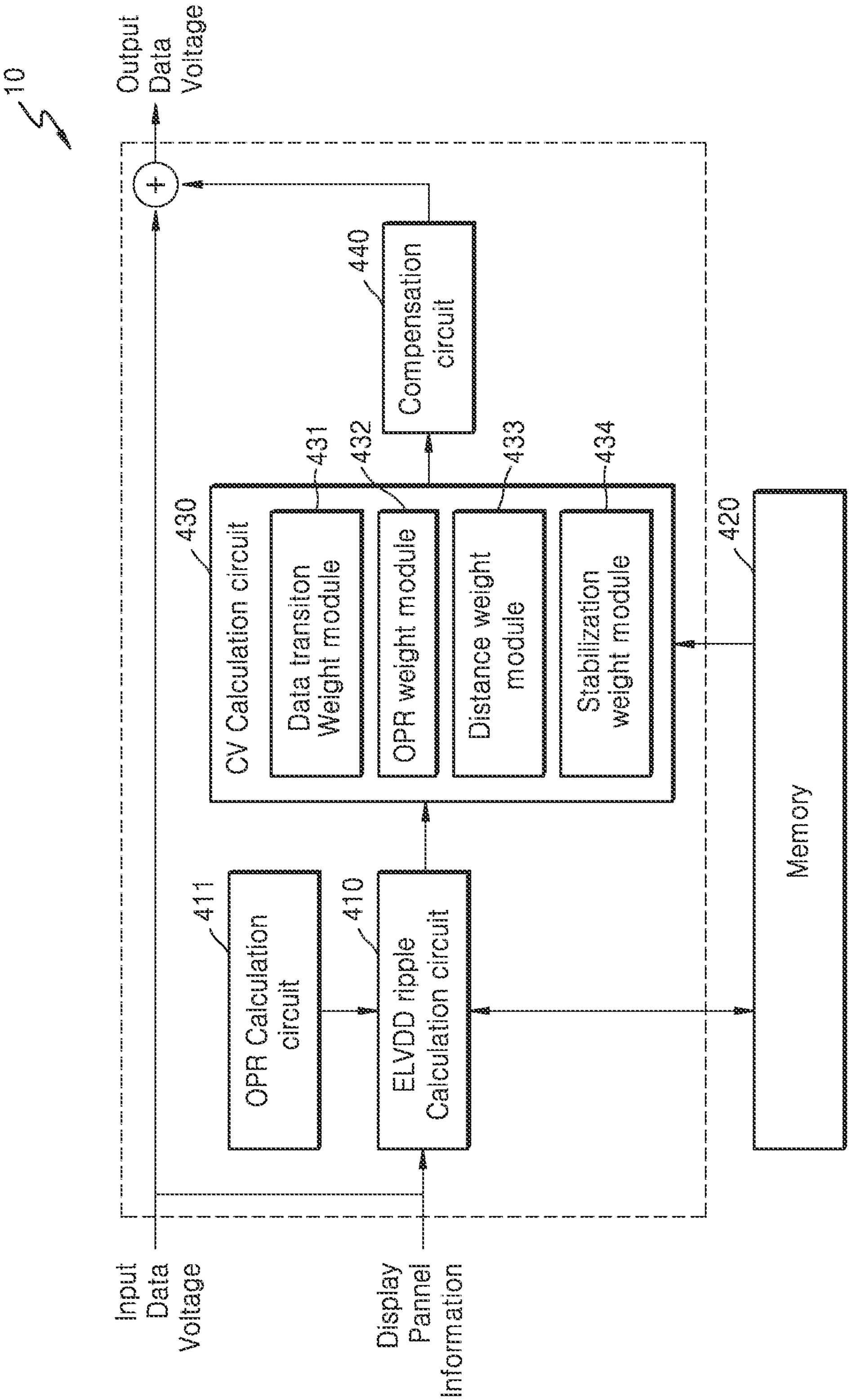
FIG. 4 is a schematic block diagram of a compensation control circuit according to an embodiment.

FIG. 4 is a schematic block diagram of a compensation control according to an embodiment. FIG. 4 shows a diagram for illustrating functional blocks in the compensation control circuit 111 of FIG. 3. An input data voltage of FIG. 4 may refer to the image data IDT (or the data voltage of the image data) received from the host processor 200 of FIG. 2, and an output data voltage of FIG. 4 may be output to the timing controller 112 as image data compensated by the compensation control circuit 111.

In addition, display panel information of FIG. 4 may include information related to characteristics of the display panel, e.g., information on a data line structure or a multiplexer (MUX) structure, which runs on the display panel. The information on the data line structure of the display panel may include information on a data line structure selected from among a single data line (SDL) structure or a dual data line (DDL) structure. The information on the MUX structure of the display panel may include information on a MUX structure selected from among a no-MUX structure, a two-MUX structure, or a 4:1 MUX structure.

Referring to FIG. 4, the compensation control circuit 111 may include an ELVDD ripple calculation circuit 410, memory 420, a compensation voltage (CV) calculation circuit 430, and a compensation circuit 440.

An OPR calculation circuit 411 may calculate an OPR of a target line to a previous line in the display panel and transmit the generated OPR information to the ELVDD ripple calculation circuit 410. In the disclosure, the target line may refer to a line scanned in a corresponding scan period among a plurality of pixel lines (e.g., row lines) arranged in the display panel. For example, the magnitude of the OPR of the target line to the previous line may be determined based on the difference between the mean data voltage (or mean grayscale voltage) of the target line and the mean data voltage (or mean grayscale voltage) of the previous line to the target line. The target line is a $n^{th}$ scan line and the previous line is a n-1$^{th}$ scan line.

The ELVDD ripple calculation circuit 410 may receive display panel information from an external processor, and may receive the OPR information from the OPR calculation circuit 411. For example, since the amount of ripple of the driving voltage ELVDD is affected by the characteristics of the display panel and/or the OPR of the target line in the display panel, the ELVDD ripple calculation circuit 410 may calculate the amount of ripple of the driving voltage ELVDD based on the display panel information and/or the OPR information. In addition, the ELVDD ripple calculation circuit 410 may calculate the amount of ripple of the driving voltage ELVDD based on the information on the amount of ripple of the driving voltage ELVDD generated from at least one previous line stored in the memory 420, or information on the mean grayscale voltage from at least one previous line stored in the memory 420. The ELVDD ripple calculation circuit 410 may predict the amount of crosstalk in the target line based on the calculated amount of ripple of the driving voltage ELVDD. The ELVDD ripple calculation circuit 410 may transmit the information on the amount of ripple of the driving voltage ELVDD to the CV calculation circuit 430.

The CV calculation circuit 430 may include at least one of a plurality of weight modules (e.g., a data transition weight module 431, an OPR weight module 432, a distance weight module 433, or a stabilization weight module 434), and may apply a weight to be applied by each of the plurality of weight modules described above based on the information on the amount of ripple of the driving voltage ELVDD. The CV calculation circuit 430 may apply a weight corresponding to characteristics of the plurality of weight modules among the plurality of weights stored in the memory 420.

The CV calculation circuit 430 may generate a compensation voltage by applying at least one selected weight. For example, the CV calculation circuit 430 may generate a compensation voltage based on Equation 1 below.

$$V_{xt}(n)=\alpha\times\Delta V_d(n)\times W_{opr}\times W_V+V_c(n-1)\times\tau(n-1) \quad \text{[Equation 1]}$$

where $V_{xt}(n)$ may refer to a compensation voltage value of an $n^{th}$ scan line (i.e., referred to as target line), $V_{xt}(n)$ may refer to a variance of a data voltage value in the target line, α may refer to a weight coefficient according to the data transition applied by the data transition weight module 431 (in Equation 1, the data transition weight coefficient is expressed as one term (e.g., $\alpha\times V_d(n)$), but is not limited thereto. According to an embodiment, Equation 1 may include a plurality of data transition weight coefficients), $W_{opr}$ may refer to an OPR weight coefficient for the target line applied by the OPR weight module 432, $W_V$ may refer to a vertical distance weight coefficient applied by the distance weight module 433, τ(n-1) may refer to a stabilization weight coefficient for the compensation voltage ($V_c$(n-1)) of the previous line (e.g., the n-1$^{th}$ scan line) applied by the stabilization weight module 434 (in Equation 1, the stabilization weight coefficient is expressed as one term (e.g., τ(n-1)), but is not limited thereto. According to an embodiment, Equation 1 may include a plurality of stabilization weight coefficients). Equation 1 may include a plurality of data variance-related terms (e.g., $\Delta V_{d1}(n)$ and $\Delta V_{d2}(n)$ according to a structure of the display panel (e.g., data line structure and/or MUX structure), and may also include a plurality of terms related to lines (e.g., compensation voltage ($V_c$(n-1)) of the n-1$^{th}$ scan line, compensation voltage $V_c$(n=2)) of the n-2$^{th}$ scan line, etc.).

The compensation circuit 440 may effectively compensate for transformation and/or loss of input image data due to crosstalk by adding the compensation voltage ($V_{xt}(n)$, to the generated input image data (e.g., data voltage of the input image data).

FIG. 4 illustrates that the CV calculation circuit 430 includes a plurality of weight modules (e.g., the data transition weight module 431, the OPR weight module 432, the distance weight module 433, or the stabilization weight module 434) but is not limited thereto. According to an embodiment, the CV calculation circuit 430 may operate as one of the plurality of weight modules or a combination of some of the plurality of weight modules (e.g., the data transition weight module 431, the OPR weight module 432, the distance weight module 433, or the stabilization weight module 434). A detailed description of an operation of each weight module is given below with reference to FIGS. 6A to 9C.

Figure 5:
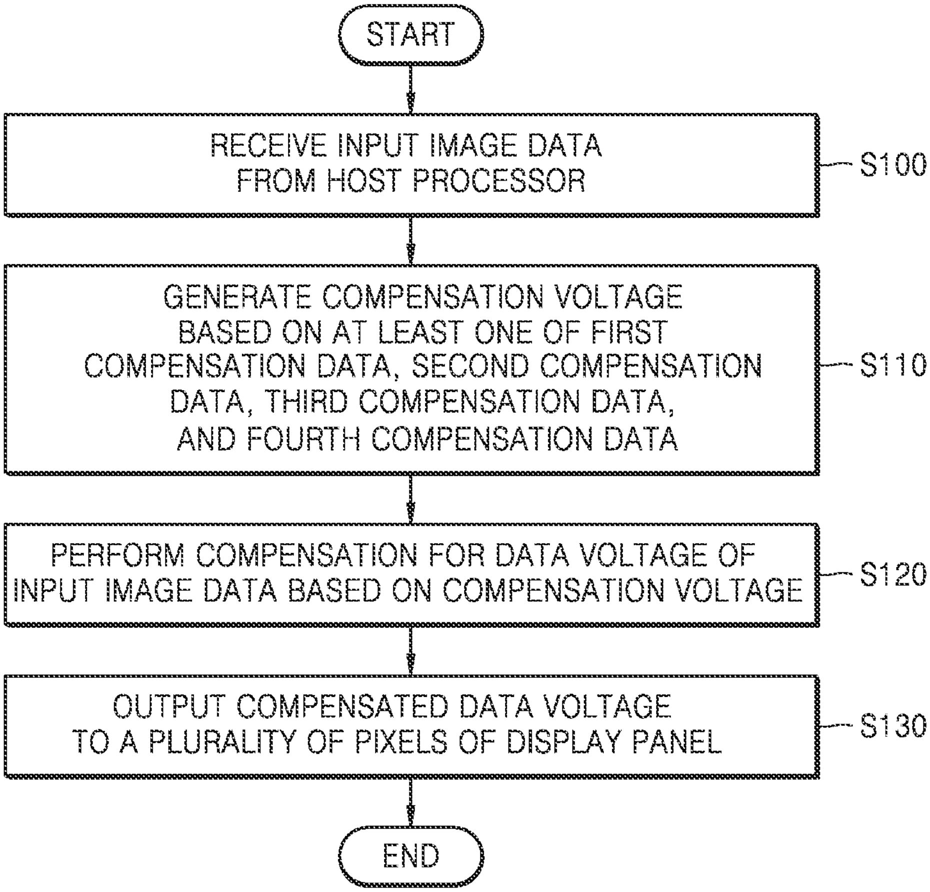
FIG. 5 is a flowchart illustrating a method of operating a display driving circuit, according to an embodiment.

FIG. 5 is a flowchart illustrating a method of operating a display driving circuit, according to an embodiment.

Specifically, FIG. 5 is a diagram for illustrating an operation method, performed by the display device 100 of FIG. 2, for compensating for lost image data (or data voltage) due to crosstalk by using a compensation voltage generated considering a cause of crosstalk and characteristics of a display panel.

In the disclosure, the target line may refer to a line that is scanned in a corresponding scan period among a plurality of pixel lines (e.g., row lines) in the display panel.

Referring to FIG. 5, the operations of generating a compensation voltage and compensating image data, performed by the display device 100 of FIG. 2, may include operations S100, S110, S120, and S130.

In operation S100, the display driving circuit 110 may receive input image data from the host processor 200.

In operation S110, the display driving circuit 110 may generate a compensation voltage based on at least one of first compensation data, second compensation data, third compensation data, and fourth compensation data. The first compensation data to the fourth compensation data may refer to weight data to be applied to the input image data according to the characteristics of the display panel and the cause of crosstalk.

In an embodiment, the first compensation data may be generated based on a variance of a data voltage of the input image data, and information of the display panel. A detailed description thereof is given below with reference to FIGS. 6A to 6C. In an embodiment, the second compensation data may be generated based on the amount of a first ripple of the driving voltage of the target line of the display panel and the amount of a second ripple of the driving voltage of an adjacent line adjacent to the target line, where the second ripple may refer to a ripple of the driving voltage generated in the line adjacent to the target line due to the first ripple. A detailed description thereof is given below with reference to FIGS. 9A to 9B. In an embodiment, the third compensation data may be generated based on an OPR of the previous line to the target line. A detailed description thereof is given below with reference to FIG. 7. In an embodiment, the fourth compensation data may be generated based on a vertical distance from the display driving circuit 110 to each pixel arranged in the display panel. A detailed description thereof is given below with reference to FIGS. 8A to 8B.

In operation S120, the display driving circuit 110 may compensate the data voltage of the input image data based on the compensation voltage. For example, the display driving circuit 110 may compensate lost/transformed input image data due to crosstalk by adding the generated compensation voltage to the data voltage of the input image data.

In operation S130, the display driving circuit 110 may output the compensated data voltage to a plurality of pixels of the display panel.

As described above, according to an embodiment, a display driving circuit, and a display device and a display system which include the same may compensate for image data (e.g., data voltage) by using a compensation voltage generated considering a cause of crosstalk and characteristics of a display panel to effectively remove crosstalk and perform optimized compensation for the image data, thereby enhancing the overall performance of the display system.

Figure 6A:
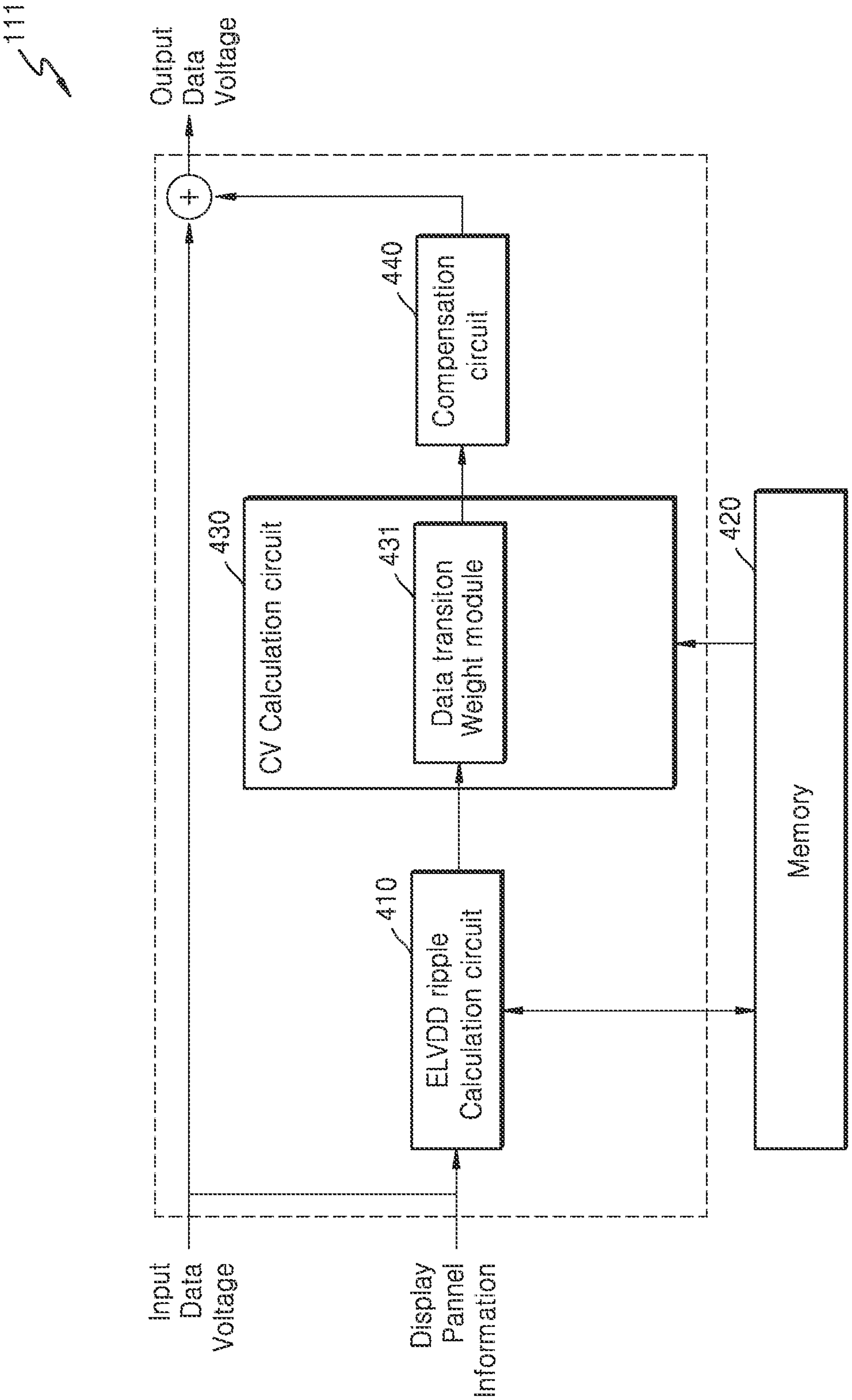
FIG. 6A is a block diagram of an example of a compensation control circuit, according to an embodiment.

FIG. 6A is a block diagram of an example of a compensation control circuit, according to an embodiment.

Specifically, FIG. 6A is a diagram for illustrating an operation in which the compensation control circuit 111 of FIG. 4 generates a compensation voltage by applying a weight according to the variance of image data (or the variance of data voltage). Since the ELVDD ripple calculation circuit 410, the memory 420, and the compensation circuit 440 of FIG. 6A have been described with reference to FIG. 4, duplicate descriptions thereof are omitted.

The variance of the image data (or the variance of the data voltage) may be proportional to the variance of the image pattern for display, and the amount of ripple of the driving voltage (or the amount of crosstalk) may be proportional to the variance of the image data (or the variance of the data voltage). However, embodiments are not limited thereto.

Referring to FIG. 6A, the CV calculation circuit 430 may include a data transition weight module 431. The data transition weight module 431 may apply a data transition weight corresponding to a variance of image data (or a variance of data voltage) of a target line to be scanned among a plurality of weights stored in the memory 420. The data transition weight may correspond to $\alpha$ in Equation 1 of FIG. 4 described above. Since the variance of the image data (or the variance of the data voltage) increases as the variance of the image pattern to be displayed increases, the CV calculation circuit 430 may also apply a large value of the data transition weight. In one embodiment, the pattern that transitions from a gray area to a black area is a first image pattern, and the pattern that transitions from a white area to a black area is a second image pattern. Since the variance of image data of the second image pattern is larger than that of the first image pattern, the data transition weight applied to the second image pattern may be relatively greater than the data transition weight applied to the first image pattern.

Figure 6B:
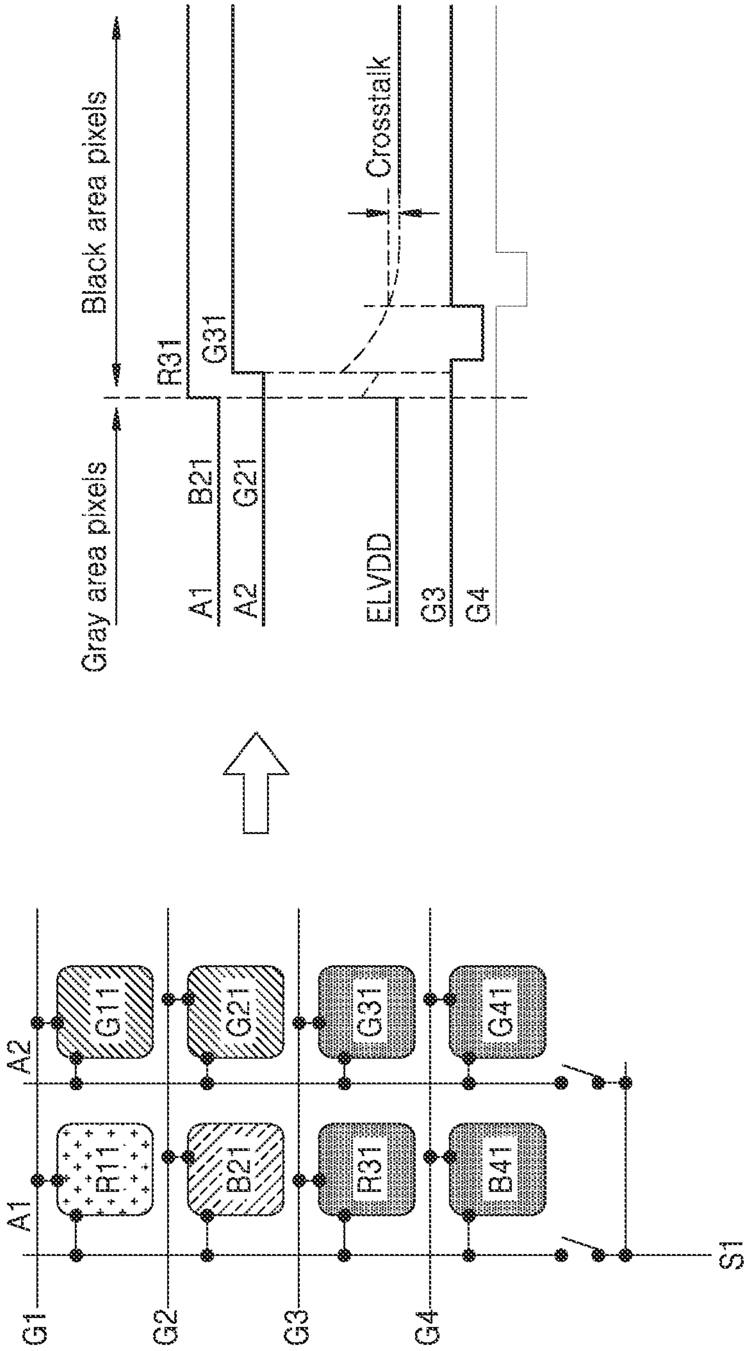
FIG. 6B is a diagram for illustrating an operation of generating a compensation voltage based on a display panel structure, according to an embodiment.
Figure 6C:
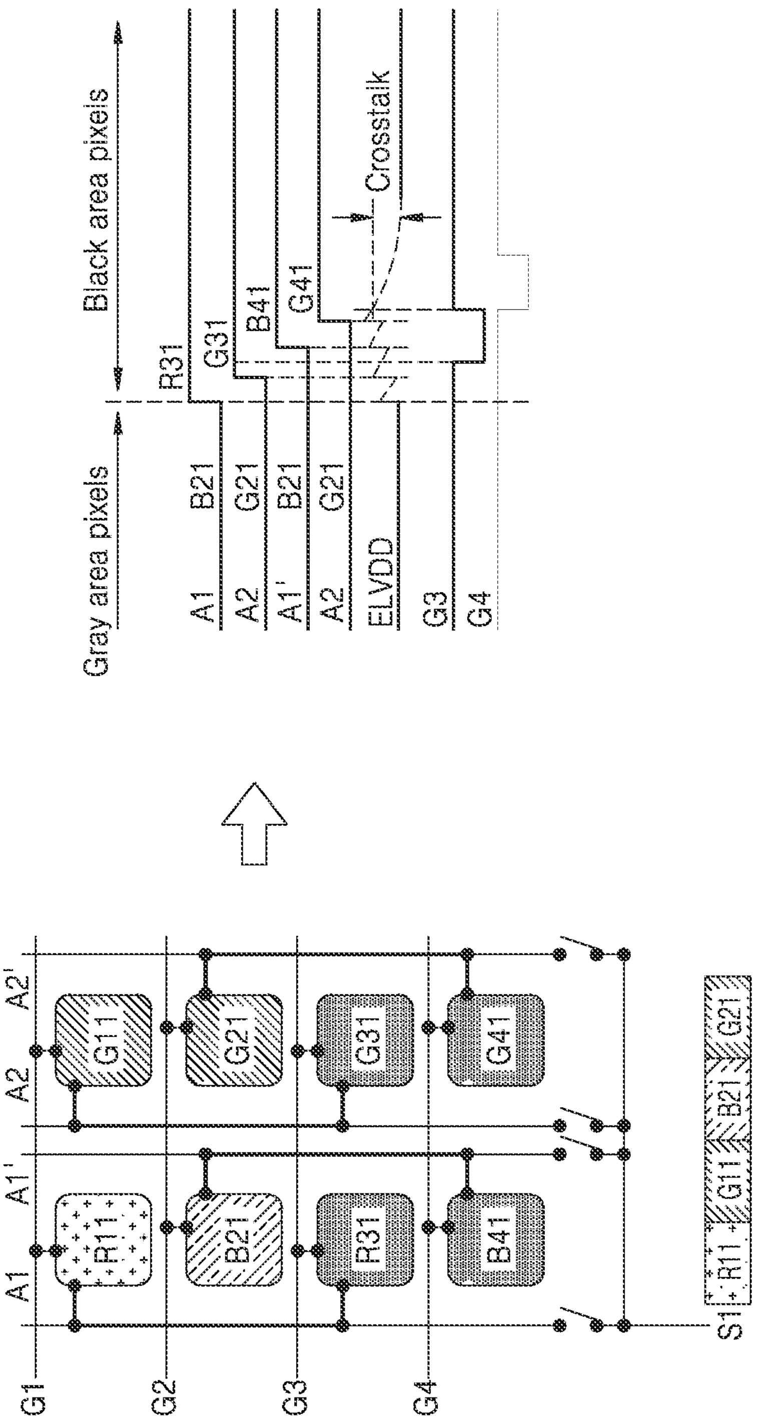
FIG. 6C is a diagram for illustrating an operation of generating a compensation voltage based on a display panel structure, according to an embodiment.

In an embodiment, the CV calculation circuit 430 may apply a data transition weight, using different algorithms according to the data line structure of the display panel. In FIGS. 6B to 6C described below, an embodiment of applying a data transition weight for each type of data line structure is disclosed.

According to an embodiment, a display driving circuit or a display device (or a display system which includes the same display driving circuit) may adaptively generate a compensation voltage, considering structural characteristics of the display panel, by applying different weights to the compensation voltage for each data line structure of the display panel.

FIG. 6B is a diagram for illustrating an operation of generating a compensation voltage based on a display panel structure, according to an embodiment.

The pixel arrangement of FIG. 6B is shown in the RGBG format but is not limited thereto. In some embodiments, the pixel arrangement of the display panel may be configured in various pixel arrangement forms, such as GGRB format or RBGB format.

Specifically, FIG. 6B is a diagram for illustrating an embodiment in which the data transition weight is applied by the CV calculation circuit 430 of FIG. 6A in an SDL structure of the display panel.

In FIG. 6B, in one embodiment, as the image pattern transitions (e.g., from a gray area to a black area) when scanning a line G3 among a plurality of lines arranged on the display panel, a ripple is caused in the driving voltage ELVDD, which results in crosstalk.

Referring to FIG. 6B, in the SDL structure of the display panel, a first pixel R11, a second pixel B21, a third pixel R31, and a fourth pixel B41 of the display panel may output pixel data to a source line S1 via a first data line A1, and a fifth pixel G11, a sixth pixel G21, a seventh pixel G31, and an eighth pixel G41 of the display panel may output pixel data to the source line S1 via a second data line A2.

When the line G3 of the display panel is scanned, the CV calculation circuit 430 may generate a compensation voltage by applying a data transition weight based on Equation 2.

$$\alpha 1\times\Delta V_{d1}(n)=a*(R31-B21)+b*(G31-G21) \quad \text{[Equation 2]}$$

where "$\alpha 1\times\Delta V_{d1}(n)$", which is a value in which a data transition weight is applied to a variance of image data (or data voltage) in the SDL structure, may correspond to $\alpha\times\Delta V_d(n)$ of Equation 1. "a" may refer to a data transition weight in the first data line A1, "(R31-B21)" may refer to a variance of the image data (or a variance of the data voltage) in the first data line A1, "b" may refer to a data transition weight in the second data line A2, and "(G31-G21)" may refer to a variance of the image data (or a variance of the data voltage) in the second data line A2.

In an embodiment, the CV calculation circuit 430 may generate a compensation voltage based on "$\alpha 1\times\Delta V_{d1}(n)$" calculated according to Equation 2. For example, the CV calculation circuit 430 may generate a compensation voltage ($V_{xt}(n)$) based on Equation 3.

$$V_{xt}(n)=\alpha 1\times\Delta V_{d1}(n) \quad \text{[Equation 3]}$$

In an embodiment, the CV calculation circuit 430 may generate a compensation voltage by applying at least one weight of Equation 1 described above to "$\alpha 1\times\Delta V_{d1}(n)$" calculated according to Equation 3.

In an embodiment, the CV calculation circuit 430 may generate a compensation voltage by substituting "$\alpha 1\times\Delta V_{d1}(n)$" calculated according to Equation 3 into "$\alpha\times\Delta V_{d1}(n)$", of Equation 1 described above.

FIG. 6C is a diagram for illustrating an operation of generating a compensation voltage based on a display panel structure, according to an embodiment.

Specifically, FIG. 6C is a diagram for illustrating an embodiment in which the data transition weight is applied by the CV calculation circuit 430 of FIG. 6A in the DDL structure of the display panel.

The pixel arrangement of FIG. 6C is shown in the RGBG format but is not limited thereto. In some embodiments, the pixel arrangement of the display panel may be configured in various pixel arrangement forms, such as GGRB format or RBGB format.

In FIG. 6C, in one embodiment, as the image pattern transitions (e.g., from a gray area to a black area) when scanning a line G3 among a plurality of lines arranged on the display panel, a ripple is caused in the driving voltage ELVDD, resulting in crosstalk.

Referring to FIG. 6C, in the DDL structure of the display panel, the first pixel R11 and the third pixel R31 of the display panel may output pixel data to the source line S1 via the first data line A1, and the second pixel B21 and the fourth pixel B41 of the display panel may output pixel data to the source line S1 via the second data line A1'.

The fifth pixel G11 and the seventh pixel G31 of the display panel may output pixel data to the source line S1 via the third data line A2, and the sixth pixel G21 and the eighth pixel G41 of the display panel may output pixel data to the source line S1 via the fourth data line A2'.

When the line G3 of the display panel is scanned, the CV calculation circuit 430 may generate a compensation voltage by applying a data transition weight based on Equation 4.

$$\alpha 2\times\Delta V_{d2}(n)=e*(R31-R11)+f*(B41-B21)+g*(G31-G11)+h*(G41-G21) \quad \text{[Equation 4]}$$

where "$\alpha 2\times\Delta V_{d2}(n)$", which is a value in which a data transition weight is applied to a variance of the image data (or data voltage) in the DDL structure, may correspond to $\alpha\times\Delta V_d(n)$ of Equation 1. "e" may refer to a data transition weight in the first data line A1, "(R31-R11)" may refer to a variance of the image data (or a variance of the data voltage) in the first data line A1, "f" may refer to a data transition weight in the second data line A1', and "(B41-B21)" may refer to a variance of the image data (or a variance of the data voltage) in the second data line A1'. "g" may refer to a data transition weight in the third data line A2, "(G31-G11)" may refer to a variance of the image data (or a variance of the data voltage) in the third data line A2, "h" may refer to a data transition weight in the fourth data line A2', and "(G41-G21)" may refer to a variance of the image data (or a variance of the data voltage) in the fourth data line A2'.

In an embodiment, the CV calculation circuit 430 may generate a compensation voltage based on "$\alpha 2\times\Delta V_{d2}(n)$", calculated according to Equation 4. For example, the CV calculation circuit 430 may generate a compensation voltage ($V_{xt}(n)$) based on Equation 5.

$$V_{xt}(n)=\alpha 2\times\Delta V_{d2}(n). \quad \text{[Equation 5]}$$

In an embodiment, the CV calculation circuit 430 may generate a compensation voltage by applying "$\alpha 2\times\Delta V_{d2}(n)$" calculated according to Equation 5 and at least one weight of Equation 1 described above.

In an embodiment, the CV calculation circuit 430 may generate a compensation voltage by substituting "$\alpha 2\times\Delta V_{d2}(n)$" calculated according to Equation 5 into "$\alpha\times\Delta V_d(n)$" of Equation 1 described above.

Figure 6D:
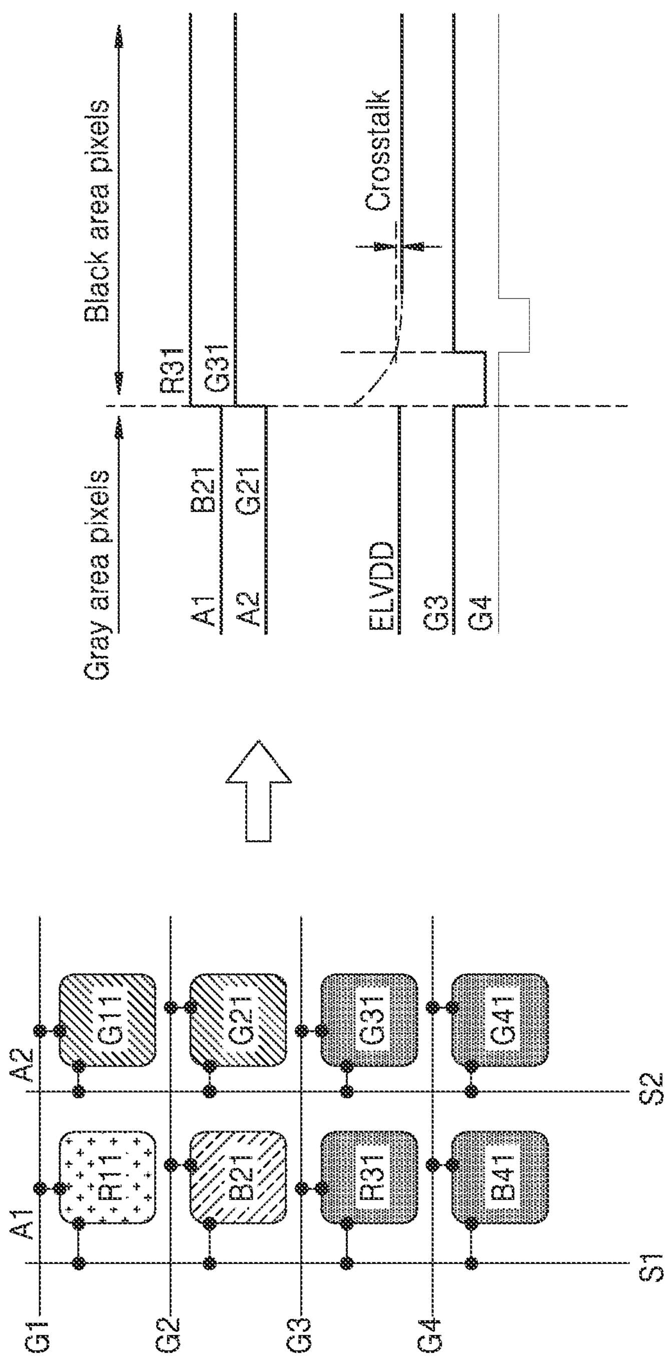
FIG. 6D is a diagram for illustrating an operation of generating a compensation voltage based on a display panel structure, according to an embodiment.

FIG. 6D is a diagram for illustrating an operation of generating a compensation voltage based on a display panel structure, according to an embodiment.

The pixel arrangement of FIG. 6D is shown in the RGBG format, but is not limited thereto. In some embodiments, the pixel arrangement of the display panel may be configured in various pixel arrangement forms, such as GGRB format or RBGB format.

Specifically, FIG. 6D is a diagram for illustrating an embodiment in which the data transition weight is applied by the CV calculation circuit 430 of FIG. 6A in a no-MUX structure of the display panel.

In FIG. 6D, it is assumed that as the image pattern transitions (e.g., from a gray area to a black area) when scanning a line G3 among a plurality of lines arranged on the display panel, a ripple is caused in the driving voltage ELVDD, resulting in crosstalk.

Referring to FIG. 6D, in the SDL structure of the display panel, a first pixel R11, a second pixel B21, a third pixel R31, and a fourth pixel B41 of the display panel may output pixel data to a source line S1 via a first data line A1, and a fifth pixel G11, a sixth pixel G21, a seventh pixel G31 and an eighth pixel G41 of the display panel may output pixel data to the source line S2 via a second data line A2.

When the line G3 of the display panel is scanned, the CV calculation circuit 430 may generate a compensation voltage by applying a data transition weight based on Equation 6.

$$\alpha 3 \times \Delta V_{d3}(n) = a * \left( \frac{(R31 - B21) + (G31 - G21)}{2} \right), \quad \text{[Equation 6]}$$

where "$\alpha 3 \times \Delta V_{d3}(n)$", which is a value in which a data transition weight is applied to a variance of image data (or data voltage) in the SDL structure, may correspond to $\alpha \times \Delta V_d(n)$ of Equation 1. "a" may refer to a data transition weight in the first data line A1, "(R31-B21)" may refer to a variance of the image data (or a variance of the data voltage) in the first data line A1, and "(G31-G21)" may refer to a variance of the image data (or a variance of the data voltage) in the second data line A2. In Equation 6, only the first data line A1 and the second data line A2 are described, but are not limited thereto. In one embodiment, the CV calculation circuit 430 may generate a compensation voltage based on a variance of image data up to the $n^{th}$ data line (An)(n≥1) arranged on the display panel.

In an embodiment, the CV calculation circuit 430 may generate a compensation voltage based on "$\alpha 3 \times \Delta V_{d3}(n)$", calculated according to Equation 6. For example, the CV calculation circuit 430 may generate a compensation voltage ($V_{xt}(n)$) based on Equation 7.

$$V_{xt}(n) = \alpha 3 \times \Delta V_{d3}(n) \quad \text{[Equation 7]}$$

In an embodiment, the CV calculation circuit 430 may generate a compensation voltage by applying at least one weight of Equation 1 described above to $\alpha 3 \times \Delta V_{d3}(n)$ calculated according to Equation 7.

In an embodiment, the CV calculation circuit 430 may generate a compensation voltage by substituting "$\alpha 3 \times \Delta V_{d3}(n)$" calculated according to Equation 7 into $\alpha \times \Delta V_d(n)$ of Equation 1 described above.

Figure 7:
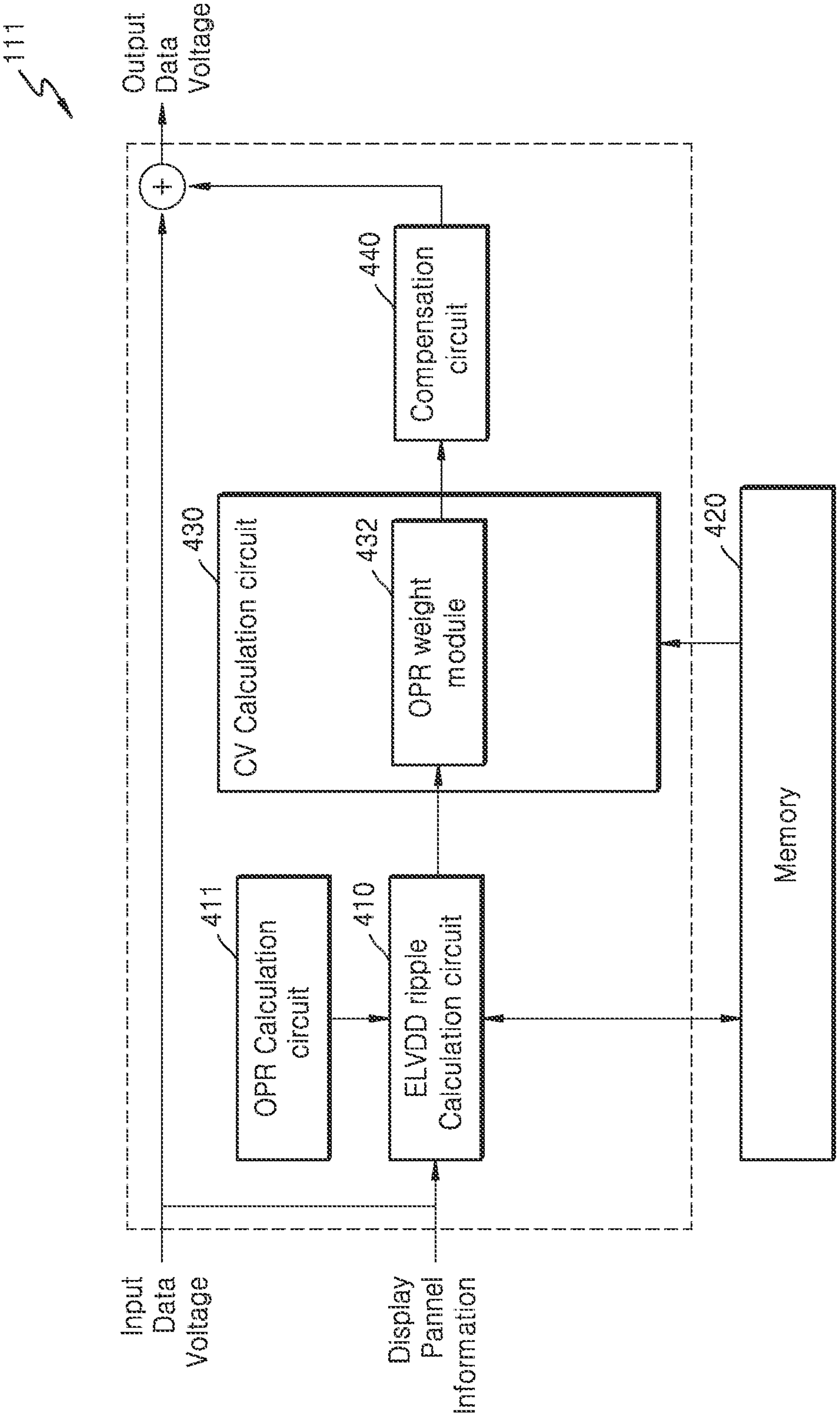
FIG. 7 is a block diagram of an example of a compensation control circuit, according to an embodiment.

FIG. 7 is a block diagram of an example of a compensation control circuit, according to an embodiment.

Specifically, FIG. 7 is a diagram for illustrating an operation in which the compensation control circuit 111 of FIG. 4 generates a compensation voltage by applying a weight according to the OPR of the target line. Since the ELVDD ripple calculation circuit 410, the OPR calculation circuit 411, the memory 420, and the compensation circuit 440 of FIG. 7 have been described with reference to FIG. 4, duplicate descriptions thereof are omitted.

The amount of ripple (or the amount of crosstalk) of the driving voltage may be proportional to the magnitude of the OPR of the target line. However, embodiments are not limited thereto. In the disclosure, the target line may refer to a line that is scanned in a corresponding scan period among a plurality of pixel lines (e.g., row lines) arranged in the display panel.

Referring to FIG. 7, the CV calculation circuit 430 may include an OPR weight module 432. The OPR weight module 432 may select an OPR weight corresponding to the OPR of the target line from among a plurality of weights stored in the memory 420. The OPR weight may correspond to "$W_{opr}$" in Equation 1 of FIG. 4 described above. For example, a large value may be selected for the OPR weight in proportion to the magnitude of the OPR of the target line, but is not limited thereto. For example, the magnitude of the OPR of the target line may be determined based on at least one of a data mean value of the previous line (e.g., mean value of data voltage or mean value of grayscale), a data mean value of the target line (e.g., mean value of data voltage or mean value of grayscale), or a difference between the data mean value of the previous line and the data mean value of the target line.

In an embodiment, the CV calculation circuit 430 may generate a compensation voltage ($V_{xt}(n)$) based on Equation 8.

$$V_{xt}(n) = \Delta V_d(n) \times W_{opr}, \quad \text{[Equation 8]}$$

where $\Delta V_d(n)$ may refer to a variance of a data voltage value in the target line, and $W_{opr}$ may refer to an OPR weight coefficient for the target line applied by the OPR weight module 432.

In an embodiment, the CV calculation circuit 430 may generate a compensation voltage by applying at least one weight of Equation 1 described above to "$\Delta V_d(n) \times W_{opr}$" calculated according to Equation 8.

In an embodiment, the CV calculation circuit 430 may generate a compensation voltage by substituting "$\Delta V_d(n) \times W_{opr}$" calculated according to Equation 8 into Equation 1 described above.

According to an embodiment, a display driving circuit or a display device (or a display system which includes the same display driving circuit) may generate a compensation voltage by adaptively applying a weight corresponding to the OPR Of the target line of the display panel.

Figure 8A:
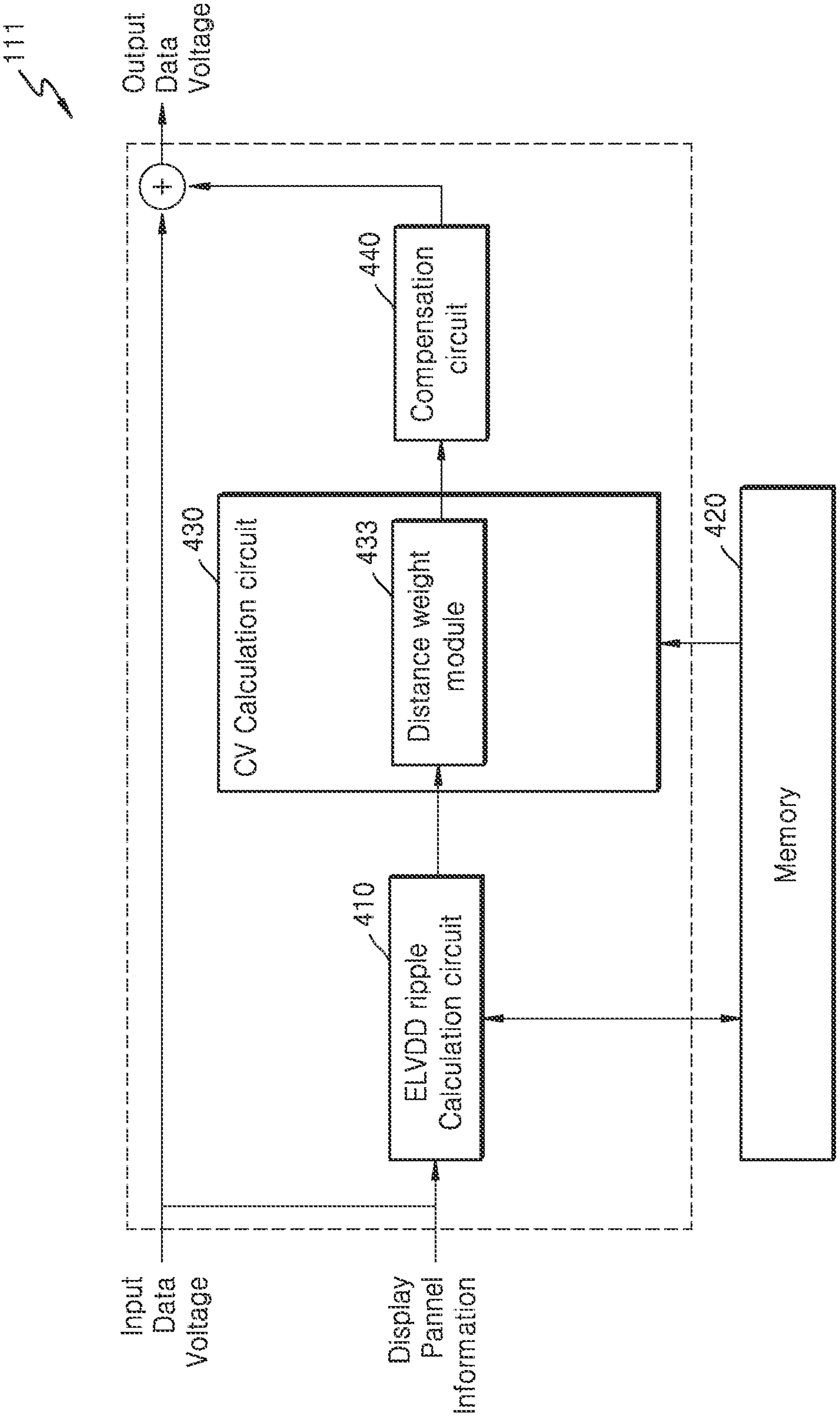
FIG. 8A is a block diagram of an example of a compensation control circuit, according to an embodiment.

FIG. 8A is a block diagram of an example of a compensation control circuit, according to an embodiment.

Specifically, FIG. 8A is a diagram for illustrating an operation in which the compensation control circuit 111 of FIG. 4 generates a compensation voltage by applying a weight according to a vertical distance of a pixel arranged on the display panel. Since the ELVDD ripple calculation circuit 410, the memory 420, and the compensation circuit 440 of FIG. 8A have been described with reference to FIG. 4, duplicate descriptions thereof are omitted.

The amount of ripple (or the amount of crosstalk) of the driving voltage may be proportional to the vertical distance of a pixel arranged on the display panel. However, embodiments are not limited thereto.

Referring to FIG. 8A, the CV calculation circuit 430 may include a distance weight module 433. The distance weight module 433 may select a distance weight corresponding to a vertical distance of a target pixel among a plurality of weights stored in the memory 420. The distance weight may correspond to "$W_V$" in Equation 1 of FIG. 4 described above. For example, a large value may be selected for the distance weight in proportion to the distance from the display driving circuit to the corresponding pixel, but is not limited thereto.

In an embodiment, the CV calculation circuit 430 may generate a compensation voltage ($V_{xt}(n)$) based on Equation 9.

$$V_{xt}(n) = \Delta V_d(n) \times W_V, \quad \text{[Equation 9]}$$

where $\Delta V_d(n)$ may refer to a variance of a data voltage value in the target line, and $W_V$ may refer to a distance weight coefficient for the corresponding pixel applied by the distance weight module 433.

In an embodiment, the CV calculation circuit 430 may generate a compensation voltage by applying at least one weight of Equation 1 described above to "$\Delta V_d(n) \times W_V$" calculated according to Equation 9.

In an embodiment, the CV calculation circuit 430 may generate a compensation voltage by substituting "$\Delta V_d(n) \times W_V$" calculated according to Equation 9 into Equation 1 described above.

According to an embodiment, a display driving circuit or a display device (or a display system which includes the same display driving circuit) may generate a compensation voltage by adaptively applying a weight corresponding to the distance from the display driving circuit to the pixel.

Figure 8B:
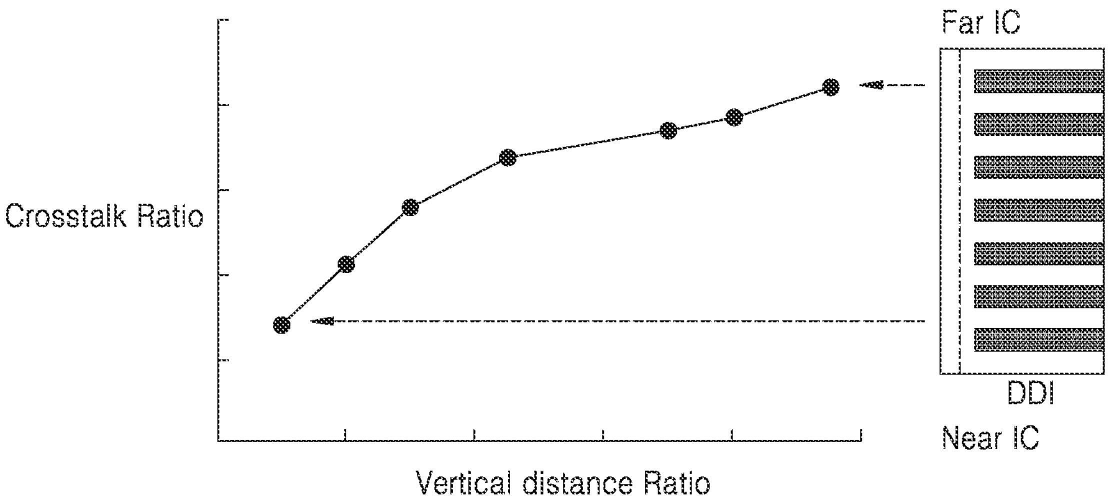
FIG. 8B is a diagram for illustrating an operation of generating a compensation voltage based on distance information, according to an embodiment.

FIG. 8B is a diagram for illustrating an operation of generating a compensation voltage based on distance information, according to an embodiment.

Referring to FIG. 8B, a horizontal axis may refer to a vertical distance from a display driver IC DDI to a corresponding pixel, and a vertical axis may refer to a crosstalk occurrence rate.

As shown in FIG. 8B, as the vertical distance from the display driver IC DDI to the corresponding pixel increases, the crosstalk occurrence rate increases. For example, when a first pixel is near the DDI (Near IC) and a second pixel is far from the DDI (Far IC), the amount of crosstalk in image data of the second pixel may be relatively larger than the amount of crosstalk in image data of the first pixel.

In FIG. 8B, it is assumed that the crosstalk occurrence rate increases as the vertical distance from the display driver IC DDI to the corresponding pixel increases, but an embodiment is not limited thereto.

Figure 9A:
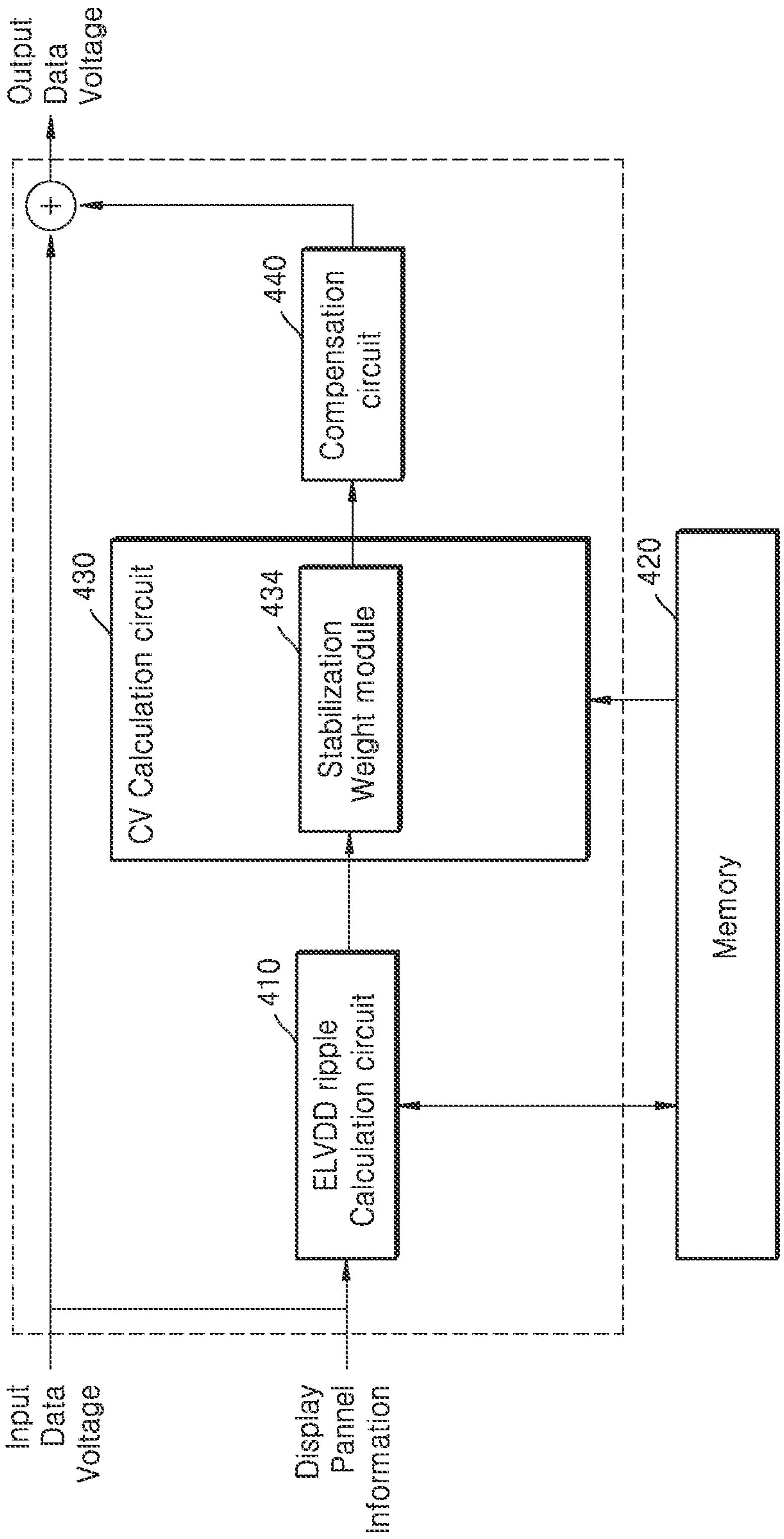
FIG. 9A is a block diagram of an example of a compensation control circuit, according to an embodiment.

FIG. 9A is a block diagram of an example of a compensation control circuit, according to an embodiment.

Specifically, FIG. 9A is a diagram for illustrating an operation in which the compensation control circuit 111 of FIG. 4 generates a compensation voltage by applying a weight according to a stabilization period in which the driving voltage ELVDD of the adjacent line is affected by the ripple of the driving voltage ELVDD generated in the target line. Since the ELVDD ripple calculation circuit 410, the memory 420, and the compensation circuit 440 of FIG. 8A have been described with reference to FIG. 4, duplicate descriptions thereof are omitted.

The ripple (or crosstalk) of the driving voltage ELVDD in the target line of the display panel may also affect the driving voltage ELVDD of the adjacent line during the stabilization period of the target line. The amount of ripple (or the amount of crosstalk) of the driving voltage ELVDD in the adjacent line may increase as the distance from the target line to the adjacent line decreases, but is not limited thereto. For example, an embodiment may include a case in which the amount of ripple (or the amount of crosstalk) of the driving voltage ELVDD in the adjacent line decreases as the distance from the target line to the adjacent line decreases. Another embodiment may include a case in which the amount of ripple (or crosstalk) of the driving voltage ELVDD in the adjacent line increases as the distance from the target line to the adjacent line increases, and a case in which the amount of ripple (or crosstalk) of the driving voltage ELVDD in the adjacent line decreases as the distance from the target line to the adjacent line increases.

In the disclosure, the adjacent line may refer to at least one adjacent pixel line continuously arranged from the target line in the display panel.

Referring to FIG. 9A, the CV calculation circuit 430 may include a stabilization weight module 434. The stabilization weight module 434 may select a stabilization weight, from among a plurality of weights stored in the memory 420, based on at least one of information on characteristics of the display panel (e.g., characteristic information for each line of the display panel) or operating environment information of the display driving circuit. The stabilization weight may correspond to "τ" in Equation 1 of FIG. 4 described above. For example, a large value may be selected for the stabilization weight in proportion to the distance from the target line to the adjacent line, but is not limited thereto.

In an embodiment, the CV calculation circuit 430 may generate a compensation voltage based on a stabilization period of the driving voltage of the target line of the display panel after a first ripple of the driving voltage occurs in the target line of the display panel. For example, the CV calculation circuit 430 may select the stabilization weight corresponding to the adjacent line from among the plurality of weights when a second ripple occurs in the adjacent line of the target line during the stabilization period. The second ripple of the adjacent line may refer to a ripple caused by the first ripple of the target line.

The CV calculation circuit 430 may generate a second compensation voltage for the adjacent line by applying the stabilization weight to the second compensation voltage for the adjacent line. The CV calculation circuit 430 may generate a final compensation voltage based on the first compensation voltage for the target line and the second compensation voltage for the adjacent line. For example, the CV calculation circuit 430 may generate the final compensation voltage by adding the first compensation voltage for the target line to the second compensation voltage for the adjacent line.

In an embodiment, the CV calculation circuit 430 may generate a compensation voltage based on Equation 10 and Equation 11. For example, the CV calculation circuit 430 may calculate a total compensation voltage in an even channel of the display panel based on Equation 10. For example, the CV calculation circuit 430 may calculate the total compensation voltage in an odd channel of the display panel based on Equation 11. For example, the CV calculation circuit 430 may generate the final compensation voltage based on the total compensation voltage in the odd channel and the total compensation voltage in the even channel of the display panel.

$$dV_{elvdd\_even}{*}\mathrm{even}V_{comp\_even}(n){*}(V_{comp\_even}(n)+V_{comp}(n-1)\times\tau(n-1)+V_{comp}(n-2)+V_{comp}(n-3)\times\tau(n-3)+\ldots, \quad \text{[Equation 10]}$$

where "$dV_{elvdd\_even}$" may refer to a total compensation voltage in an even channel of the display panel, "$V_{comp\_even}$ (n)", may refer to a (first) compensation voltage for the target line ($n^{th}$ line), "$V_{comp}$(n-1)" may refer to a compensation voltage for a first adjacent line (n-$\mathbf{1}^{th}$ line), "$V_{comp}$ (n-2)" may refer to a compensation voltage for a second adjacent line (n-$\mathbf{2}^{th}$ line), and "$V_{comp}$(n-3)" may refer to a compensation line for a third adjacent line (n-$\mathbf{3}^{th}$ line), "τ(n-1)" may refer to a stabilization weight coefficient for the first adjacent line (n-$\mathbf{1}^{th}$ line), "τ(n-2)" may refer to a stabilization weight coefficient for the second adjacent line (n-$\mathbf{2}^{th}$ line), and "τ(n-3)" may refer to a stabilization weight coefficient for the third adjacent line (n-$\mathbf{3}^{th}$ line). The CV calculation circuit 430 according to an embodiment may compensate up to the n-$m^{th}$ line ((n−m)≥1) according to various factors of the stabilization period, although an embodiment of performing compensation for up to the third adjacent line (n-$\mathbf{3}^{th}$ line) is illustrated in Equation 10.

$$dV_{elvdd\_odd}{*}\mathrm{odd}V_{elvdd_{comp}}(n)=(V_{comp_{odd}}(n)+V_{comp}(n-1)\times\tau(n-1)+V_{comp}(n-2)\times\tau(n-2)+V_{comp}(n-3)\times\tau(n-3)+\ldots, \quad \text{[Equation 11]}$$

where "$dV_{elvdd\_odd}$" may refer to a total compensation voltage in an even channel of the display panel, "$V_{comp_{odd}}$ (n)" may refer to a compensation voltage for the target line ($n^{th}$ line), "$V_{comp}$(n-1)" may refer to a compensation voltage for a first adjacent line (n-$\mathbf{1}^{th}$ line), "$V_{comp}$(n-2)" may refer to a compensation voltage for a second adjacent line (n-$\mathbf{2}^{th}$ line), and "$V_{comp}$(n-3)" may refer to a compensation line for a third adjacent line (n-$\mathbf{3}^{th}$ line), "τ(n-1)", may refer to a stabilization weight coefficient for the first adjacent line (n-$\mathbf{1}^{th}$ line), "τ(n-2)" may refer to a stabilization weight coefficient for the second adjacent line (n-$2^{th}$ line), and "τ(n-3)" may refer to a stabilization weight coefficient for the third adjacent line (n-$3^{th}$ line).

In an embodiment, the CV calculation circuit 430 may generate a compensation voltage ($V_{xt}(n)$) based on Equation 12.

$$V_{xt}(n)=\Delta V_d(n)+V_c(n-1)\times\tau(n-1) \quad \text{[Equation 12]}$$

where $\Delta V_d(n)$ may refer to a variance of a data voltage value in the target line, and τ may refer to a stabilization weight coefficient applied by the stabilization weight module 434.

In an embodiment, the CV calculation circuit 430 may generate a compensation voltage by applying at least one weight of Equation 1 described above to "$\Delta V_d(n)+V_c(n-1)\times\tau(n-1)$" calculated according to Equation 12.

In an embodiment, the CV calculation circuit 430 may generate a compensation voltage by substituting "$\Delta V_d(n)+V_c(n-1)\times\tau(n-1)$" calculated according to Equation 12 into Equation 1 described above.

Figure 9B:
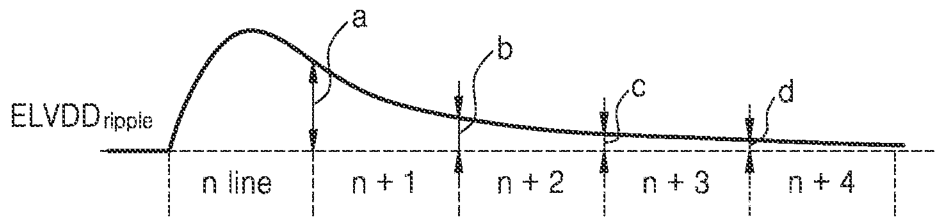
FIG. 9B is a diagram for illustrating an operation of generating a compensation voltage based on a stabilization period, according to an embodiment.

FIG. 9B is a diagram for illustrating an operation of generating a compensation voltage based on a stabilization period, according to an embodiment.

FIG. 9B shows that the ripple of the driving voltage ELVDD generated in the $n^{th}$ line (e.g. target line) of the display panel affects the driving voltage ELVDD of adjacent lines, such as a n+$1^{th}$ line, a n+$2^{th}$ line, a n+$3^{th}$ line, and a n+$4^{th}$ line.

When the amount of ripple of the driving voltage ELVDD generated in the $n^{th}$ line (e.g., target line) is "a", the amount of ripple of the driving voltage ELVDD generated in the n+$1^{th}$ line, which is an adjacent line, is "b", the amount of ripple of the driving voltage ELVDD generated in the n+$2^{th}$ line is "c", and the amount of ripple of the driving voltage ELVDD generated in the n+$3^{th}$ line is "d". For example, when the amount of ripple of the driving voltage ELVDD generated in the $n^{th}$ line (e.g., target line) is "69", the amount of ripple of the driving voltage ELVDD generated in the n+$1^{th}$ line, which is an adjacent line, is "28", the amount of ripple of the driving voltage ELVDD generated in the n+$2^{th}$ line is "11", and the amount of ripple of the driving voltage ELVDD generated in the n+$3^{th}$ line is "4".

Thus, an embodiment may provide a display driving circuit that generates a compensation voltage in consideration of the ripple (or crosstalk) of the driving voltage ELVDD in the adjacent line caused by the ripple (or crosstalk) of the driving voltage ELVDD in the target line, and a display device or a display system which includes the same.

Figure 9C:
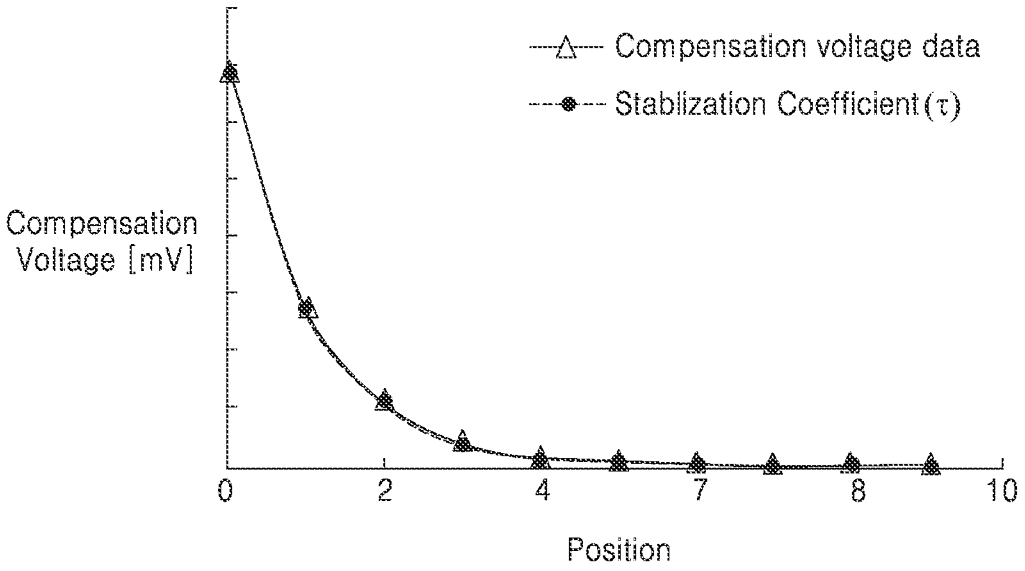
FIG. 9C is a diagram for illustrating an operation of generating a compensation voltage based on a stabilization period, according to an embodiment.

FIG. 9C is a diagram for illustrating an operation of generating a compensation voltage based on a stabilization period, according to an embodiment.

Specifically, FIG. 9C illustrates a graph of the compensation voltage generated by applying the stabilization weight by the CV calculation circuit 430 of FIG. 9A.

Referring to FIG. 9C, a horizontal axis may refer to a position of the adjacent line relative to the target line (origin) in the display panel, and a vertical axis may refer to a compensation voltage.

The CV calculation circuit 430 according to an embodiment may determine the stabilization weight (τ) based on at least one of characteristics of the display panel, a stabilization period of the ripple generated in the target line, or a position (or distance) from the target line to the adjacent line.

In an embodiment, the CV calculation circuit 430 may generate a relatively large compensation voltage by applying a larger stabilization weight (τ) to adjacent lines located closer to the target line (origin). For example, the CV calculation circuit 430 may generate a relatively small compensation voltage by applying a smaller stabilization weight (τ) to adjacent lines located farther from the target line (origin).

In FIG. 9C, an embodiment in which a larger stabilization weight (τ) is applied to adjacent lines located closer to the target line (origin) is illustrated, but is not limited thereto. For example, the CV calculation circuit 430 according to an embodiment may apply a smaller stabilization weight (τ) to adjacent lines located closer to the target line (origin) according to the characteristics of the display panel and the stabilization period of the ripple generated in the target line.

Figure 10:
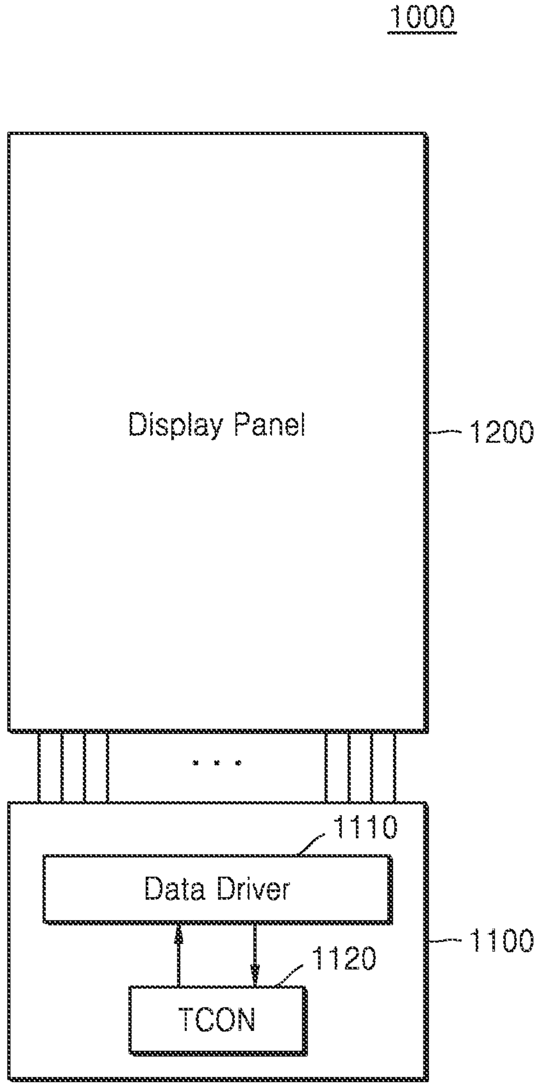
FIG. 10 is an implementation of a display device, according to an embodiment.

FIG. 10 is an implementation of a display device, according to an embodiment.

The display device 1000 of FIG. 10, which is a device having a small display panel 1200, may be applied to, e.g., a mobile device such as a smartphone, a tablet PC, and the like.

Referring to FIG. 10, the display device 1000 may include a display driving circuit 1100 and a display panel 1200. The display driving circuit 1100 may include one or more ICs, may be mounted on a circuit film such as a tape carrier package (TCP), a chip on film (COF), an flexible print circuit (FPC), and the like, may be attached to the display panel 1200 in a tape-automated bonding (TAB) manner, or may be mounted on a non-display area (e.g., an area where an image is not displayed) of the display panel 1200 in a chip on glass (COG) manner.

The display driving circuit 1100 may include a data driver 1110 and control logic 1120, and may further include a gate driver. In an embodiment, the gate driver may be mounted to the display panel 1200.

Figure 11:
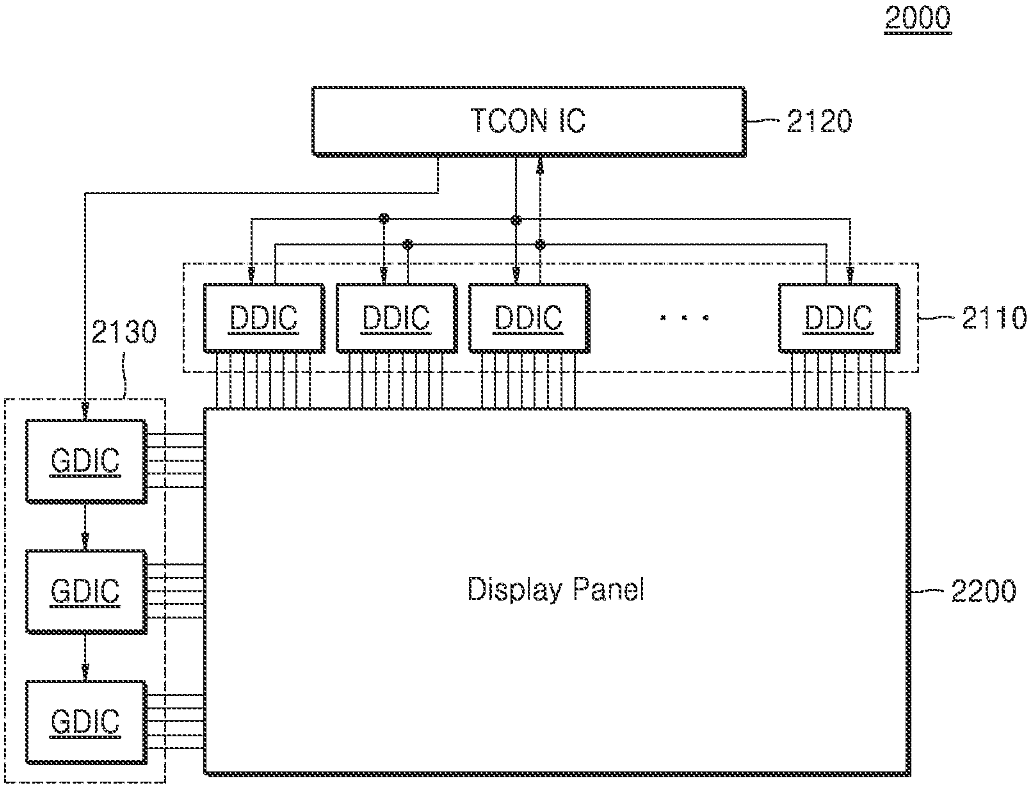
FIG. 11 is an implementation of a display device, according to an embodiment.

FIG. 11 is an implementation of a display device, according to an embodiment.

The display device of FIG. 11, which is a device having a medium- or large-sized display panel 2200, may be applied to, e.g., a television, a monitor, and the like.

Referring to FIG. 11, the display device 2000 may include a data driver 2110, a timing controller 2120, a gate driver 2130, and a display panel 2200.

The timing controller 2120 may include one or more ICs or modules. The timing controller 2120 may communicate with a plurality of data driving ICs DDIC and a plurality of gate driving ICs GDIC through a set interface.

The timing controller 2120 may generate control signals for controlling driving timings of the plurality of data driving ICs DDIC and the plurality of gate driving ICs GDIC, and may provide the control signals to the plurality of data driving ICs DDIC and the plurality of gate driving ICs GDIC.

The timing controller 2120 may generate and provide the control signals to compensate the image data (or data voltage) using the compensation voltage to which at least one compensation data is applied according to the characteristics of the display panel and/or the cause of crosstalk. The at least one compensation data may include compensation data for the variance of the image data (or the data voltage) and/or the characteristics of the display panel, compensation data of the OPR, compensation data on a distance from the display driving circuit, compensation data on stabilization of the driving voltage.

The data driver 2110 may include the plurality of data driving ICs DDIC, may be mounted on a circuit film in a TCP, COF, or FPC manner, may be attached to the display panel 2200 in a TAB manner, and may be mounted on a non-display area of the display panel 2200 in a COG manner.

The gate driver 2130 which includes the plurality of gate driving ICs GDIC may be mounted on a circuit film and attached to the display panel 2200 in a TAB manner, or may be mounted on a non-display area of the display panel 2200 in a COG manner. Alternatively, the gate driver 2130 may be formed directly on the lower substrate of the display panel 2200 in a gate-driver in panel (GIP) manner. The gate driver 2130 is formed in a non-display area outside the pixel array where the sub-pixels PX are formed in the display panel 2200, and may be formed by the same TFT process as the sub-pixels PX.

While embodiments of the disclosure has been particularly shown and described, it will be understood that various changes in form and details may be made therein without departing from the spirit and scope of the following claims.

What is claimed is:

1. A display driving circuit comprising:
- a compensation control circuit configured to:
  - generate a compensation voltage based on input image data and information of a display panel operatively connected to the display driving circuit, and
  - compensate a data voltage of the input image data based on the compensation voltage;
- a timing control circuit configured to output the compensated data voltage, via a data driver, to a plurality of pixels in the display panel; and
- a gamma voltage generator configured to provide a reference voltage to the data driver.

2. The display driving circuit of claim 1, wherein the compensation control circuit is further configured to:
- select a data transition weight, based on a variance of the data voltage of the input image data and a structure of the display panel, and
- generate the compensation voltage by applying the selected data transition weight.

3. The display driving circuit of claim 2, wherein the information of the display panel comprises structure information of data lines driven by the display panel or multiplexer (MUX) structure information.

4. The display driving circuit of claim 3, wherein the structure information of data lines comprises information on a structure selected from a single data line (SDL) structure or a dual data line (DDL) structure, and
- wherein the MUX structure information comprises information on a MUX structure selected from among a no-MUX structure, a two-MUX structure, or a 4:1 MUX structure.

5. The display driving circuit of claim 1, wherein the compensation control circuit is further configured to:
- measure a vertical distance from the display driving circuit to each of the plurality of pixels, and
- generate the compensation voltage at each of the plurality of pixels based on the measured vertical distance.

6. A display driving circuit comprising:
- a compensation control circuit configured to:
  - after a first ripple of a driving voltage in a target line of a display panel occurs, generate a first compensation voltage for the target line based on a stabilization period of the driving voltage of the target line, and
  - compensate a data voltage of input image data based on the first compensation voltage;
- a timing control circuit configured to output the compensated data voltage, via a data driver, to a plurality of pixels arranged in a plurality of lines in the display panel; and
- a gamma voltage generator configured to provide a reference voltage to the data driver.

7. The display driving circuit of claim 6, wherein the compensation control circuit is further configured to:
- based on a second ripple occurring in an adjacent line adjacent to the target line during the stabilization period, select a stabilization weight corresponding to the adjacent line from among a plurality of weights,
- apply the stabilization weight to a second compensation voltage for the adjacent line, and
- generate a final compensation voltage based on the second compensation voltage for the adjacent line to which the stabilization weight is applied and the first compensation voltage for the target line.

8. The display driving circuit of claim 7, wherein the stabilization weight is determined based on characteristic information for each line of the display panel and operating environment information of the display driving circuit.

9. The display driving circuit of claim 7, wherein the second ripple of the adjacent line is caused by the first ripple of the target line, and
- wherein the adjacent line corresponds to at least one adjacent line continuously arranged from the target line in the display panel.

10. The display driving circuit of claim 6, wherein the compensation control circuit is further configured to measure a vertical distance from the display driving circuit to each of the plurality of pixels and to generate the first compensation voltage at each of the plurality of pixels based on the measured vertical distance.

11. A display driving circuit electrically connected to a display panel in which a plurality of pixels are arranged in a plurality of lines, the display driving circuit comprising:
- a compensation control circuit configured to generate a compensation voltage based on an on pixel ratio (OPR) of a previous line to a target line of the display panel and perform compensation for a data voltage of input image data based on the compensation voltage; and
- a timing control circuit configured to output the compensated data voltage, via a data driver, to the plurality of pixels; and
- a gamma voltage generator configured to provide a reference voltage to the data driver.

12. The display driving circuit of claim 11, wherein the OPR is determined based on at least one of a mean data value of the previous line, a mean data value of the target line, and a difference between the mean data value of the previous line and the mean data value of the target line, and
- wherein the mean data value corresponds to a mean value of the compensated data voltage or a mean value of grayscale for each line.

13. The display driving circuit of claim 11, wherein the compensation control circuit is further configured to:
- select an OPR weight corresponding to the OPR from among a plurality of weights, and
- generate the compensation voltage based on a value obtained by applying the selected OPR weight corresponding to the OPR to a data voltage variance of the target line compared to the previous line.

14. The display driving circuit of claim 11, wherein the compensation control circuit is further configured to:
- measure a vertical distance from the display driving circuit to each of the plurality of pixels, and
- generate the compensation voltage at each of the plurality of pixels based on the measured vertical distance.

* * * * *